United States Patent
Wang

(10) Patent No.: US 11,055,710 B2
(45) Date of Patent: Jul. 6, 2021

(54) SYSTEMS AND METHODS FOR VERIFYING AND PROCESSING TRANSACTIONS USING VIRTUAL CURRENCY

(71) Applicant: Visa International Service Association, San Francisco, CA (US)

(72) Inventor: Quan Wang, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 1444 days.

(21) Appl. No.: 14/268,822

(22) Filed: May 2, 2014

(65) Prior Publication Data

US 2014/0330721 A1    Nov. 6, 2014

Related U.S. Application Data

(60) Provisional application No. 61/818,697, filed on May 2, 2013, provisional application No. 61/818,824, filed on May 2, 2013.

(51) Int. Cl.
*G06Q 20/40* (2012.01)
*G06Q 40/04* (2012.01)
*G06Q 20/06* (2012.01)

(52) U.S. Cl.
CPC ............ *G06Q 20/40* (2013.01); *G06Q 20/06* (2013.01); *G06Q 40/04* (2013.01)

(58) Field of Classification Search
CPC .................................................... G06Q 40/04
See application file for complete search history.

(56) References Cited

U.S. PATENT DOCUMENTS 5,613,012 A    3/1997 Hoffman
5,781,438 A    7/1998 Lee
(Continued)

FOREIGN PATENT DOCUMENTS

EP          2156397 A1    2/2010
KR    10-2004-0052132 A    6/2004
(Continued)

OTHER PUBLICATIONS

Ellingwood, "An Introduction to Networking Terminology, Interfaces, and Protocols", https://www.digitalocean.com/community/tutorials/an-introduction-to-networking-terminology-interfaces-and-protocols, Jan. 2014.*

(Continued)

*Primary Examiner* — Neha Patel
*Assistant Examiner* — Gabriel Mercado
(74) *Attorney, Agent, or Firm* — Kilpatrick Townsend & Stockton LLP

(57) ABSTRACT

A payment processing system may be integrated with a centralized virtual currency issuing and transaction processing system to provide a standardized and more efficient virtual currency that can provide easier tracking of and use of a consumer's virtual currency balance. The payment processing system may implement a network communications systems that may allow the payment processing system to obtain additional consumer, merchant and transaction information for a transaction by data fields transmitted in a network header portion of a network communications protocol packet. The additional information may be stored and cross-referenced to provide greater transaction tracking data.

2 Claims, 13 Drawing Sheets

(56) References Cited

U.S. PATENT DOCUMENTS

| | | |
|---|---|---|
| 5,883,810 A | 3/1999 | Franklin |
| 5,953,710 A | 9/1999 | Fleming |
| 5,956,699 A | 9/1999 | Wong |
| 6,000,832 A | 12/1999 | Franklin |
| 6,014,635 A | 1/2000 | Harris |
| 6,044,360 A | 3/2000 | Picciallo |
| 6,163,771 A | 12/2000 | Walker |
| 6,227,447 B1 | 5/2001 | Campisano |
| 6,236,981 B1 | 5/2001 | Hill |
| 6,267,292 B1 | 7/2001 | Walker |
| 6,327,578 B1 | 12/2001 | Linehan |
| 6,341,724 B2 | 1/2002 | Campisano |
| 6,385,596 B1 | 5/2002 | Wiser |
| 6,422,462 B1 | 7/2002 | Cohen |
| 6,425,523 B1 | 7/2002 | Shem Ur |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,868,391 B1 | 3/2005 | Hultgren |
| 6,879,965 B2 | 4/2005 | Fung |
| 6,891,953 B1 | 5/2005 | DeMello |
| 6,901,387 B2 | 5/2005 | Wells |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,051,929 B2 | 5/2006 | Li |
| 7,069,249 B2 | 6/2006 | Stolfo |
| 7,103,576 B2 | 9/2006 | Mann, III |
| 7,113,930 B2 | 9/2006 | Eccles |
| 7,136,835 B1 | 11/2006 | Flitcroft |
| 7,177,835 B1 | 2/2007 | Walker |
| 7,177,848 B2 | 2/2007 | Hogan |
| 7,194,437 B1 | 3/2007 | Britto |
| 7,209,561 B1 | 4/2007 | Shankar et al. |
| 7,264,154 B2 | 9/2007 | Harris |
| 7,287,692 B1 | 10/2007 | Patel |
| 7,292,999 B2 | 11/2007 | Hobson |
| 7,350,230 B2 | 3/2008 | Forrest |
| 7,353,382 B2 | 4/2008 | Labrou |
| 7,379,919 B2 | 5/2008 | Hogan |
| RE40,444 E | 7/2008 | Linehan |
| 7,415,443 B2 | 8/2008 | Hobson |
| 7,444,676 B1 | 10/2008 | Asghari-Kamrani |
| 7,469,151 B2 | 12/2008 | Khan |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,848,980 B2 | 12/2010 | Carlson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,171,525 B1 | 5/2012 | Pelly |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,467,807 B1 | 6/2013 | Dalit et al. |
| 8,478,639 B2 | 7/2013 | Antonucci |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,433,116 B2 | 9/2013 | Davis et al. |
| 8,533,860 B1 | 9/2013 | Grecia |
| 8,538,845 B2 | 9/2013 | Liberty |
| 8,555,079 B2 | 10/2013 | Shablygin |
| 8,559,968 B2 | 10/2013 | Frank et al. |
| 8,566,168 B1 | 10/2013 | Bierbaum |

(56) References Cited

U.S. PATENT DOCUMENTS

| | | | |
|---|---|---|---|
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2002/0153424 A1* | 10/2002 | Li .................. G06K 19/06206 235/492 |
| 2003/0028481 A1 | 2/2003 | Flitcroft |
| 2003/0055792 A1* | 3/2003 | Kinoshita .............. G06Q 20/04 705/67 |
| 2003/0130955 A1 | 7/2003 | Hawthorne |
| 2003/0169881 A1* | 9/2003 | Niedermeyer ......... G06Q 20/04 380/258 |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0005394 A1* | 1/2008 | Crooks .................. G06Q 20/40 710/33 |
| 2008/0015988 A1 | 1/2008 | Brown |
| 2008/0022038 A1 | 1/2008 | Akagawa et al. |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0167991 A1 | 7/2008 | Carlson et al. |
| 2008/0189210 A1 | 8/2008 | Sawhney |
| 2008/0201226 A1 | 8/2008 | Carlson et al. |
| 2008/0201264 A1 | 8/2008 | Brown |
| 2008/0201265 A1 | 8/2008 | Hewton |
| 2008/0222038 A1 | 9/2008 | Eden et al. |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0255990 A1* | 10/2008 | Moore .................. G06Q 20/06 705/42 |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0191602 A1 | 7/2010 | Mikkelsen et al. |
| 2010/0211491 A1 | 8/2010 | Kagan et al. |
| 2010/0211505 A1 | 8/2010 | Saunders |

(56) References Cited

U.S. PATENT DOCUMENTS

| | | |
|---|---|---|
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0306092 A1* | 12/2010 | Wilkes ................ G06Q 20/10 705/34 |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0112951 A1* | 5/2011 | Gould ................ G06Q 20/06 705/37 |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0212762 A1* | 9/2011 | Ocko ................ G06Q 10/10 463/25 |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276386 A1 | 11/2011 | Deemer |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0006891 A1 | 1/2012 | Zhou et al. |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047003 A1 | 2/2012 | Hammad et al. |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0142429 A1* | 6/2012 | Muller ................ A63F 13/35 463/42 |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0179528 A1 | 7/2012 | Ortiz et al. |
| 2012/0185386 A1 | 7/2012 | Salama |
| 2012/0197807 A1 | 8/2012 | Schlesser |
| 2012/0203604 A1 | 8/2012 | Baker et al. |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226530 A1 | 9/2012 | Gebb et al. |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317018 A1* | 12/2012 | Barnett ................ G06Q 20/383 705/39 |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0067208 A1* | 3/2013 | Brinkman ........... G06F 9/44505 713/1 |
| 2013/0081122 A1 | 3/2013 | Svigals |
| 2013/0091028 A1 | 4/2013 | Oder, II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159086 A1 | 6/2013 | Richard |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |

(56) References Cited

U.S. PATENT DOCUMENTS

| | | |
|---|---|---|
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0143155 A1* | 5/2014 | Karlov ............. G04G 99/006 705/71 |
| 2014/0164243 A1 | 6/2014 | Aabye et al. |
| 2014/0188586 A1 | 7/2014 | Carpenter et al. |
| 2014/0222599 A1 | 8/2014 | Wang et al. |
| 2014/0250007 A1* | 9/2014 | Howe ............. G06Q 20/409 705/44 |
| 2014/0294701 A1 | 10/2014 | Dai et al. |
| 2014/0297534 A1 | 10/2014 | Patterson |
| 2014/0310183 A1 | 10/2014 | Weber |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |
| 2016/0224976 A1 | 8/2016 | Basu |
| 2017/0046696 A1 | 2/2017 | Powell et al. |
| 2017/0103387 A1 | 4/2017 | Weber |
| 2017/0220818 A1 | 8/2017 | Nagasundaram et al. |
| 2017/0228723 A1 | 8/2017 | Taylor |

FOREIGN PATENT DOCUMENTS

| | | |
|---|---|---|
| KR | 10-2004-0052133 A | 6/2004 |
| WO | 2001035304 A1 | 5/2001 |
| WO | 2001035304 A9 | 5/2001 |
| WO | 03/073337 A1 | 9/2003 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2010/089593 A1 | 8/2010 |
| WO | 2010/094014 A1 | 8/2010 |
| WO | 2011/049871 A1 | 4/2011 |
| WO | 2011/053808 A1 | 5/2011 |
| WO | 2012/051001 A2 | 4/2012 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013/008055 A2 | 1/2013 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Microsoft Computer Dictionary, 5th edition, p. 392.*
Microsoft Computer Dictionary, 5th Edition (Year: 2002).*
Microsoft Computer Dictionary, 5th Edition, p. 232 (Year: 2002).*
International Search Report and Written Opinion dated May 22, 2014 for PCT Patent Application No. PCT/US2014/014929, 12 pages.
Wang, U.S. Appl. No. 62/000,288 (unpublished), Payment System Canonical Address Format, filed May 19, 2014.
Sharma et al., U.S. Appl. No. 62/003,717 (unpublished), Mobile Merchant Application, filed May 28, 2014.
Kalgi et al., U.S. Appl. No. 62/024,426, (unpublished) Secure Transactions Using Mobile Devices, filed Jul. 14, 2014.
Prakash et al., U.S. Appl. No. 62/037,033 (unpublished), Sharing Payment Token, filed Aug. 13, 2014.
Hoverson et al., U.S. Appl. No. 62/038,174 (unpublished), Customized Payment Gateway, filed Aug. 15, 2014.
Wang, U.S. Appl. No. 62/042,050 (unpublished), Payment Device Authentication and Authorization System, filed Aug. 26, 2014.

(56) References Cited

OTHER PUBLICATIONS

Gaddam et al., U.S. Appl. No. 62/053,736 (unpublished), Completing Transactions Without a User Payment Device, filed Sep. 22, 2014.
Patterson, U.S. Appl. No. 62/054,346 (unpublished), Mirrored Token Vault, filed Sep. 23, 2014.
Dimmick, U.S. Appl. No. 14/952,514 (unpublished), Systems Communications With Non-Sensitive Identifiers, filed Nov. 25, 2015.
Dimmick, U.S. Appl. No. 14/952,444 (unpublished), Tokenization Request Via Access Device, filed Nov. 25, 2015.
Prakash et al., U.S. Appl. No. 14/955,716 (unpublished), Provisioning Platform for Machine-To-Machine Devices, filed Dec. 1, 2015.
Wong et al., U.S. Appl. No. 14/966,948 (unpublished), Automated Access Data Provisioning, filed Dec. 11, 2015.
Stubbs et al., U.S. Appl. No. 62/103,522 (unpublished), Methods and Systems for Wallet Provider Provisioning, filed Jan. 14, 2015.
McGuire, U.S. Appl. No. 14/600,523 (unpublished), Secure Payment Processing Using Authorization Request, filed Jan. 20, 2015.
Flurscheim et al., U.S. Appl. No. 15/004,705 (unpublished), Cloud-Based Transactions With Magnetic Secure Transmission, filed Jan. 22, 2016.
Flurscheim et al., U.S. Appl. No. 62/108,403 (unpublished), Wearables With NFC HCE, filed Jan. 27, 2015.
Sabba et al., U.S. Appl. No. 15/011,366 (unpublished), Token Check Offline, filed Jan. 29, 2016.
Patterson, U.S. Appl. No. 15/019,157 (unpublished), Token Processing Utilizing Multiple Authorizations, filed Feb. 9, 2016.
Cash et al., U.S. Appl. No. 15/041,495 (unpublished), Peer Forward Authorization of Digital Requests, filed Feb. 11, 2016.
Le Saint et al., , U.S. Appl. No. 15/008,388 (unpublished), Methods for Secure Credential Provisioning, filed Jan. 27, 2016.
Kinagi, U.S. Appl. No. 62/117,291 (unpublished), Token and Cryptogram Using Transaction Specific Information, filed Feb. 17, 2015.
Galland et al. U.S. Appl. No. 62/128,709 (unpublished), Tokenizing Transaction Amounts, filed Mar. 5, 2015.
Rangarajan et al., U.S. Appl. No. 61/751,763 (unpublished), Payments Bridge, filed Jan. 11, 2013.
Li, U.S. Appl. No. 61/894,749 (unpublished), Methods and Systems for Authentication and Issuance of Tokens in a Secure Environment, filed Oct. 23, 2013.
Aissi et al., U.S. Appl. No. 61/738,832 (unpublished), Management of Sensitive Data, filed Dec. 18, 2012.
Wong et al., U.S. Appl. No. 61/879,362 (unpublished), Systems and Methods for Managing Mobile Cardholder Verification Methods, filed Sep. 18, 2013.
Powell, U.S. Appl. No. 61/892,407 (unpublished), Issuer Over-the-Air Update Method and System, filed Oct. 17, 2013.
Powell, U.S. Appl. No. 61/926,236 (unpublished), Methods and Systems for Provisioning Mobile Devices With Payment Credentials and Payment Token Identifiers, filed Jan. 10, 2014.
International Preliminary Report on Patentability dated Aug. 20, 2015 for PCT Patent Application No. PCT/US2014/014929, 9 pages.
Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.
Chipman, et al., U.S. Appl. No. 15/265,282 (Unpublished), Self-Cleaning Token Vault, filed Sep. 14, 2016.
Lopez, et al., U.S. Appl. No. 15/462,658 (Unpublished), Replacing Token on a Multi-Token User Device, filed Mar. 17, 2017.

\* cited by examiner

ISSUER DATABASE
524

| ISSUER IDENTIFIER | ISSUER ACCOUNT | ISSUED VALUE | DATE OF ISSUING | VIRTUAL CURRENCY IDENTIFIER | MERCHANT IDENTIFIER | CONSUMER IDENTIFIER | ACQUIRER IDENTIFIER |
|---|---|---|---|---|---|---|---|
| I0381 | 7489027548 | 1,000,000 | 4-1-2014 | 12548625 | M0222 | C0001 | A0528 |
| I0856 | 9384260946 | 2,500,000 | 3-18-2014 | 85432586 | M0428 | C0120 | A7812 |
| I0541 | 2485620581 | 5,000,000 | 7-15-2014 | 78521568 | M1086 | C1122 | A8926 |
| I7782 | 4758295830 | 8,000,000 | 12-12-2014 | 45876253 | M2468 | C2878 | A3678 |

FIG. 7

CONSUMER DATABASE
526

| CONSUMER IDENTIFIER | CONSUMER ACCOUNT | ACCOUNT VALUE | DEVICE IDENTIFIER | VIRTUAL CURRENCY TOKEN ID | VIRTUAL CURRENCY TOKEN VALUE | ISSUER IDENTIFIER | MERCHANT IDENTIFIER | ACQUIRER IDENTIFIER |
|---|---|---|---|---|---|---|---|---|
| C0001 | 8374012856 | 320 | D5983893620 | VC3245812 | 500 | I0381 | M0222 | A0528 |
| C0120 | 8572065184 | 855 | D1178420912 | VC4001877 | 250 | I0856 | M0428 | A7812 |
| C1122 | 7462940618 | 2802 | D2277395822 | VC8111233 | 1000 | I0541 | M1086 | A8926 |
| C2878 | 3467093782 | 3780 | D5890128538 | VC9012079 | 2100 | I7782 | M2468 | A3678 |

FIG. 8

MERCHANT DATABASE 528

| MERCHANT IDENTIFIER | MERCHANT ACCOUNT | ACCOUNT VALUE | LOCATION IDENTIFIER | VIRTUAL CURRENCY TOKEN ID | ISSUER IDENTIFIER | CONSUMER IDENTIFIER | ACQUIRER IDENTIFIER |
|---|---|---|---|---|---|---|---|
| M0222 | 3217583894 | 345,000 | M0222-4 | VC3245812 | I0381 | C0001 | A0528 |
| M0428 | 4366592811 | 785,800 | M0428-2 | VC4001877 | I0856 | C0120 | A7812 |
| M1086 | 6793511222 | 500,876 | M1086-7 | VC8111233 | I0541 | C1122 | A8926 |
| M2468 | 8895763804 | 285,728 | M2468-1 | VC9012079 | I7782 | C2878 | A3678 |

FIG. 9

TRANSACTION DATABASE
530

| TRANSACTION IDENTIFIER | TRANSACTION AMOUNT | TRANSACTION TIME | VIRTUAL CURRENCY TOKEN ID | ISSUER IDENTIFIER | CONSUMER IDENTIFIER | MERCHANT IDENTIFIER | LOCATION IDENTIFIER | GEO COORDINATES | DEVICE IDENTIFIER | ACQUIRER IDENTIFIER |
|---|---|---|---|---|---|---|---|---|---|---|
| T4271 | 100 | 3-20-2014 11:17:38 | VC3245812 | I0381 | C0001 | M0222 | M0222-4 | 40° 26' 46" N 79° 58' 56" W | D5983893620 | A0528 |
| T7238 | 58 | 3-22-2014 20:18:18 | VC4001877 | I0856 | C0120 | M0428 | M0428-2 | 20° 25' 51" S 72° 48' 16" E | D1178420912 | A7812 |
| T8022 | 1000 | 4-02-2014 02:20:01 | VC8111233 | I0541 | C1122 | M1086 | M1086-7 | 20° 36' 16" N 49° 16' 28" W | D2277395822 | A8926 |
| T9917 | 850 | 4-10-2014 18:02:27 | VC9012079 | I7782 | C2878 | M2468 | M2468-1 | 11° 34' 27" S 23° 42' 35" E | D5890128538 | A3678 |

FIG. 10

SYSTEMS AND METHODS FOR VERIFYING AND PROCESSING TRANSACTIONS USING VIRTUAL CURRENCY

CROSS-REFERENCES TO RELATED APPLICATIONS

This application is a non-provisional application of and claims the benefit of priority to U.S. Provisional Application No. 61/818,824, titled, "COMMUNICATION NETWORK INFRASTRUCTURE," filed on May 2, 2013, and U.S. Provisional Application No. 61/818,697, titled, "DIGITAL CURRENCY," filed on May 2, 2013, which are all herein incorporated by reference in their entirety for all purposes. This application is related to co-pending U.S. patent application Ser. No. 14/173,718, titled, "INTEGRATED COMMUNICATIONS NETWORK FOR TRANSACTION," filed on Feb. 5, 2014, which is herein incorporated by reference in its entirety for all purposes.

BACKGROUND

Virtual currency or digital information that is associated with a value (e.g., monetary, loyalty based, etc.) is an area that merchants, consumers, payment processors, and issuers have recognized as important as mobile devices become more powerful and omnipresent as consumers adopt such devices into their daily routines. However, typical virtual currencies are not regulated by any organization or entity, which increases their susceptibility to fraud. In addition, consumers may receive virtual currency from a significant number of merchants, including from gas stations, groceries, online and brick and mortar retailers, credit card companies, airlines, etc. It can be difficult for consumers to keep track of the merchant-specific virtual currencies, and the values associated with each merchant-specific virtual currency.

Current implementations of systems using virtual currency are limited for a number of reasons. It may be difficult to both track the number of virtual currencies from different sources and the conditions under which each of the virtual currencies may be used. For example, some virtual currencies, such as reward or loyalty points from a merchant ("Merchant X") may be accepted only by a specified group of merchants or individuals. These merchants may have a contractual agreement with Merchant X that allows the reward or loyalty points from Merchant X to be used to purchase items. This can limit the usefulness of the virtual currency where the consumer has no interest in the merchants that Merchant X's virtual currency are accepted at. These virtual currencies are essentially closed-loop currencies that may have value at selected retailers.

In other implementations, in order to use the virtual currency issued by Merchant X at Merchant Y, the consumer may have to purchase items directly from Merchant X (e.g., through a merchant website containing a catalog of available items) using their virtual currency (e.g., reward or loyalty points), and Merchant X has to process and ultimately pay Merchant Y. This implementation may require Merchant X to establish systems for processing transactions using virtual currencies, which requires significant infrastructure investment and maintenance.

Additionally, the development and wide adoption of powerful and more robust mobile communications devices has provided mobile network operators, device manufacturers, and other mobile service providers with a large amount of consumer information that may not be directly available to transaction processors. Payment processing networks and other payment systems developed largely before the emergence and adoption of such powerful mobile communications devices used by consumers. Due to the large investment required to integrate mobile devices into existing payment transaction processing flows, much of the additional information that mobile devices can provide have not been integrated into payment systems and those payment systems that have integrated such information, have not done so at the network communications protocol level. Accordingly, there is a need for payment processing systems to leverage the newly available information into their authentication, validation, and verification systems to provide more secure and regulated virtual currency marketplaces.

Therefore, there is a need for a transaction system capable of integrating a virtual currency issuing and transaction processing system with the unique information available from the mobile communication devices of consumers.

Embodiments of the invention address the above problems, and other problems, individually and collectively.

SUMMARY

Embodiments of the invention are directed at methods, systems, and apparatuses for providing a transaction processing system that is capable of generating virtual currency on behalf of merchants and centrally managing the issuance of virtual currency and processing transactions using virtual currency.

One embodiment of the invention is directed to a method comprising receiving, by a server computer, a network protocol packet including a network protocol header and a transaction payload for a transaction conducted using virtual currency. The network protocol header includes a network header portion that may include an issuer identifier, a virtual currency token identifier, and a consumer identifier. The method further comprises parsing the consumer identifier and the virtual currency token identifier from the network header portion, and determining a consumer profile using the consumer identifier. The issuer identifier and the virtual currency token identifier are verified as being associated with the determined consumer profile. The method further comprises processing transaction using virtual currency data in the consumer profile. A response message indicating authorization of the transaction is generated and transmitted to a mobile device.

Another embodiment of the invention is directed to a server computer comprising a processor, and a computer readable medium coupled to the processor, the computer readable medium comprising code, executable by the processor for implementing a method. The method comprises receiving, by a server computer, a network protocol packet including a network protocol header and a transaction payload for a transaction conducted using virtual currency. The network protocol header includes a network header portion that may include an issuer identifier, a virtual currency token identifier, and a consumer identifier. The method further comprises parsing the consumer identifier and the virtual currency token identifier from the network header portion, and determining a consumer profile using the consumer identifier. The issuer identifier and the virtual currency token identifier are verified as being associated with the determined consumer profile. The method further comprises processing transaction using virtual currency data in the consumer profile. A response message indicating authorization of the transaction is generated and transmitted to a mobile device.

Another embodiment of the invention is directed to a method comprising receiving, by a server computer, a virtual currency issuance request message for issuance of virtual currency for a consumer. The virtual currency issuance request message is received from an issuer. The method further comprises generating an issuer identifier for the issuer, and generating a virtual currency identifier for the virtual currency. The virtual currency identifier is then associated with the issuer identifier. The method further comprises storing the issuer identifier and the virtual currency identifier in an issuer profile associated with the issuer. The method further comprises providing the issuer identifier and the virtual currency to the consumer. The server computer is further configured to verify and process a transaction initiated by the consumer using the virtual currency by evaluating transaction data including a virtual currency token associated with the consumer.

Another embodiment of the invention is directed to a server computer comprising a processor, and a computer readable medium coupled to the processor, the computer readable medium comprising code, executable by the processor for implementing a method. The method comprises receiving a virtual currency issuance request message for issuance of virtual currency for a consumer. The virtual currency issuance request message is received from an issuer. The method further comprises generating an issuer identifier for the issuer, and generating a virtual currency identifier for the virtual currency. The virtual currency identifier is then associated with the issuer identifier. The method further comprises storing the issuer identifier and the virtual currency identifier in an issuer profile associated with the issuer. The method further comprises providing the issuer identifier and the virtual currency to the consumer. The server computer is further configured to verify and process a transaction initiated by the consumer using the virtual currency by evaluating transaction data including a virtual currency token associated with the consumer.

These and other embodiments of the invention are described in further detail below with reference to the Figures and the Detailed Description.

BRIEF DESCRIPTION OF THE DRAWINGS

FIG. 7 shows an example issuer database according to an embodiment of the present invention.

FIG. 8 shows an example consumer database according to an embodiment of the present invention.

FIG. 9 shows an example merchant database according to an embodiment of the present invention.

FIG. 10 shows an example transaction database according to an embodiment of the present invention.

DETAILED DESCRIPTION

Figure 1:
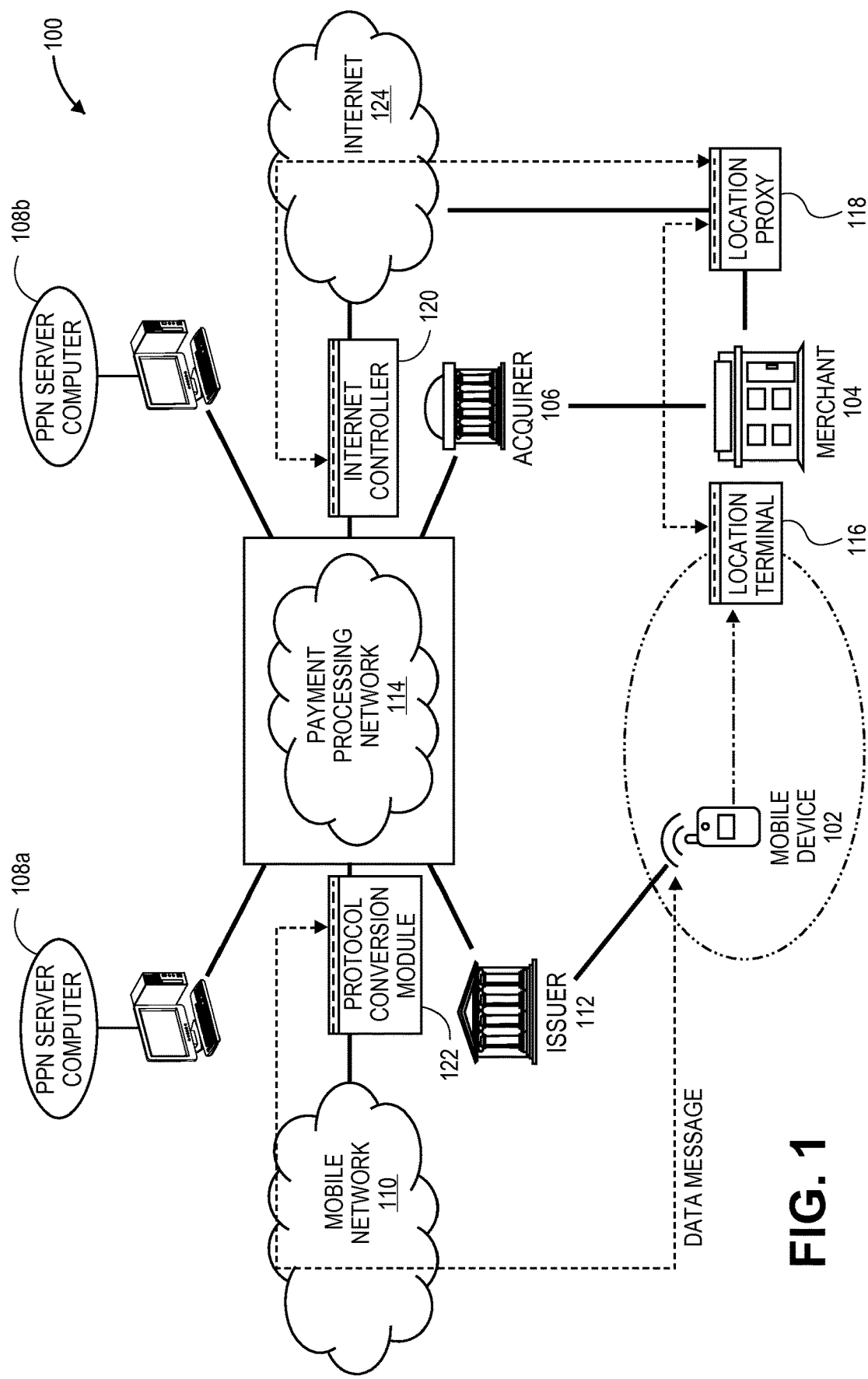
FIG. 1 shows a transaction processing system according to an embodiment of the present invention.

Embodiments of the invention are directed at methods, systems, and apparatuses for providing a transaction processing system that is capable of generating virtual currency on behalf of a virtual currency requestor (e.g., merchants, currency provider, virtual currency issuer, individuals, etc.) and centrally managing the issuance of virtual currency and processing transactions using virtual currency. An issuer identifier may be assigned to the requestor of virtual currency, and the payment processor may keep records and a balance of the virtual currency associated with a consumer. The payment processor may further verify the virtual currency, the consumer, and the transaction when virtual currency is used. By managing virtual currency issued to consumers on behalf of multiple entities (e.g., merchants, other consumers) at a central processor, embodiments of the invention can provide faster, more efficient, more secure, and more flexible virtual currency transaction processing. As the central processor can issue virtual currency, store account data regarding the virtual currency, and perform settlement processes, in some embodiments, the traditional roles of issuing bank and acquiring banks in transaction processing may be reduced or eliminated thereby reducing transaction processing time.

Further, each merchant may purchase a standardized virtual currency through the payment processor, with each unit of virtual currency having a fixed value associated with it. By providing a standardized virtual currency that is issued and managed by the payment processor, consumers may be able to use virtual currency stored in a single consumer account for any transaction at any merchant, regardless of the merchant associated with each of the virtual currencies. Further, a consumer using the standardized virtual currency does not have to keep track of different valuations of virtual currency issued by different merchants or perform multiple transactions (with the merchant or a central processing system) in order to convert one type of virtual currency into a type accepted at a particular merchant.

Some embodiments of the virtual currency system may include capabilities that allow a payment processor to obtain more information about a consumer and a merchant that existing payment systems may not be able to directly access. For example, a payment processor may send and receive additional information using a network header portion of a network communication to provide additional consumer authentication, fraud prevention, consumer-targeted advertisements and information, and/or any other relevant use of the additional data. By integrating a payment processor with the capabilities to obtain and transmit additional information about a consumer and a merchant, additional security and tracking data may be provided using data obtained through the aggregation of transactions conducted using both virtual currencies and standard payment transactions.

For example, the additional information in the network header portion may include a merchant identifier (e.g., a unique identifier associated with a merchant, service provider, government entity, or any other registered party), a location identifier (e.g., a particular merchant's store location, a location within a merchant's store, etc.), a mobile device identifier (e.g., a hardware identifier for the mobile device, a phone number, a device manufacturer serial number, etc.), a consumer identifier (e.g., a subscriber identifier, a mobile wallet identifier, a payment account user name, a phone number, etc.), a transaction type indicator (e.g., location tracking, payment transaction, account monitoring, etc.), a virtual currency issuer identifier (e.g., a unique identifier assigned to a virtual currency requestor), a virtual currency data (e.g., a virtual currency token identifier that may be used in a transaction), and/or any combination thereof.

The network header portion may allow a payment processor (or other parties to a transaction) to obtain direct access to these types of additional information about the consumer and/or merchant in order to better authenticate consumers and transactions as well as better predict consumer behavior and target consumers for advertising and management services. In some embodiments, this additional information can be made available to a payment processor without requiring the consumer to conduct a transaction (e.g., the payment processor may track a consumer device and obtain information about the device, the consumer, the virtual currency accounts associated with the consumer, etc., through the network header before a transaction has been initiated).

Furthermore, the network header portion may be integrated with existing payment systems by incorporating the network header portion information into a network communication protocol header. For example, when a payment transaction is initiated, the network header portion containing the additional consumer, merchant and location information may be transmitted in a network protocol header along with an existing type of payment message (e.g., ISO 8583 standard payment authorization request message) as a transaction payload.

Further, as the payment processing network may process both standard payment transactions and virtual currency transactions, embodiments may be incorporated into existing payment systems. For transactions performed using standard payment devices (e.g., credit cards, debit cards, stored value cards), the payment processor may assign issuer identifiers, and parse the information in the network header portion message before processing the existing payment message in the payload using existing transaction processing systems. The payment processor may then use the additional information provided in the network header portion to further authenticate and validate the transaction, as well as to cross-reference and track transaction histories of consumers and merchants.

A. DEFINITIONS

Prior to discussing embodiments of the invention, descriptions of some terms may be helpful for understanding embodiments of the invention.

The term "virtual currency" may refer to units of value that may be used as a form of payment for transactions, including financial transactions. Virtual currency may be electronically generated by and stored within a computing device. Virtual currency may be purchased using conventional forms of currency and generated with a specific value. Typically, the virtual currency may not have a physical form of tender but may be accessible through a user device (e.g., mobile device) using a software application such as a digital wallet.

The term "value exchange rate" may refer to data indicating an exchange rate between different units of value. The value exchange rate may indicate the exchange rate between a standard unit of currency and virtual currency. For example, the value exchange rate may indicate that a single unit of virtual currency can be exchanged for 0.01 U.S. Dollars. In some embodiments, the value exchange rate may indicate the exchange rate between two different virtual currencies (e.g., virtual currency A issued by the payment processing network and virtual currency B issued by a different entity).

The term "transaction currency" may refer to data indicating a unit of value for a medium of exchange (e.g., currency) used by a party to a transaction. The transaction currency may indicate the type of currency used for the transactions (e.g., US Dollars, Euros, Yen).

The term "converted transaction total" may refer to data indicating the result of a conversion of transaction amount from a first unit of value to a second unit of value. For example, the converted transaction total may be based on a conversion using a value exchange rate between a transaction currency and virtual currency. For instance, if a transaction total is $10 US Dollars (USD) and the value exchange rate between a virtual currency unit of value (e.g., points, virtual dollars, etc.) and the transaction currency (e.g., USD) is 100-1, the converted transaction total may include 1000 virtual currency units of value (e.g., points, virtual dollars, etc.).

The term "fixed monetary value" may refer to a value associated with a unit of virtual currency. The fixed monetary value may be a fixed or permanent value associated with a unit of virtual currency when the virtual currency is generated. For example, a single unit of virtual currency may have a fixed monetary value of 0.01 U.S. Dollars.

The term "network protocol packet" may refer to formatted data carried by a network. Network protocol packets typically include a network protocol header portion (i.e., control portion) and a data portion (i.e., payload). The network protocol header may include control data that provides routing, security, and error detection information that the network typically uses to interpret the information correctly and to deliver the data portion to the correct entity. For example, the network protocol header may include source and destination network addresses, error detection codes, and sequencing information. An example of a network protocol packet may be a TCP/IP packet.

The term "network header portion" may refer to a portion of the network protocol header. In embodiments of the present invention, the network header may be embedded within the traditional network header by repurposing existing fields of the tradition network header, or may be prepended, appended, or inserted into the traditional network header.

The data in the network header portion may include mobile device data (e.g., mobile device identifier), merchant data (e.g., a merchant identifier), consumer data (e.g., a consumer identifier), location data (e.g., a location identifier), transaction type data (e.g., tracking, payment transaction, account monitoring), and virtual currency data (e.g., issuer identifier and virtual currency token identifier). The network header portion may also include location data retrieved by network devices (e.g., location terminals, point-of-sale (POS) terminals, etc.). The additional data included in the network header portion may be retrieved from a mobile device associated with a user, a POS terminal used to conduct a transaction with the mobile device, or any other suitable sources associated with a transaction, user, mobile device, or payment network.

A merchant identifier may include any identifier that is associated with a particular merchant. For example, the merchant identifier may be a previously assigned identification number for a merchant. The merchant identifier may be assigned by a payment network, the merchant, or any other entity in the transaction processing system. In some embodiments, the merchant identifier may be a numeric or alphanumeric value. Examples of merchant identifiers may include "Merchant A" and "M0222."

A location identifier may include any identifier that is associated with a known location. For example, the location identifier may be an identifier corresponding to a physical address or some other geographic location. Additionally, in some embodiments, the location identifier may correspond to a URL or other virtual address on a communications network. Further, the location identifier may be associated with a particular entity within the virtual currency transaction system. For example, the location identifier may include a physical address of a merchant location or may be a URL associated with a merchant website. The physical address of the merchant location may be a standard postal address or geographic coordinates (e.g., longitude/latitude).

A device identifier may include a unique value that is associated with a device. For example, the device identifier may correspond to an identifier of a mobile device. In one embodiment, the device identifier may correspond to data stored on a subscriber identity module (SIM) of the mobile device. The device identifier may typically be a unique value associated with the mobile device to identify the mobile device. For example, in some embodiments, the device identifier may include an International Mobile Station Equipment Identity (IMEI) number.

A consumer identifier may include a unique value that is associated with a particular consumer. For example, the consumer identifier may include a digital wallet number, an email address, a phone number, a birth date, portions of a social security number, or any other consumer data associated with a particular consumer. In some embodiments, the consumer identifier may correspond to a consumer associated with a mobile device and/or a consumer account.

The term "virtual currency token identifier" may refer to information that may be used to identify an account associated with virtual currency. For example, the virtual currency token identifier can be represented as a series of numberic or alphanumeric characters. In other embodiments, the virtual currency token identifier may be one or more of a graphic, a token, a bar code, a QR code, or any other information that may be associated with an account. In some embodiments, the virtual currency token identifier may be stored in a memory component of a user device (e.g., mobile device).

The term "virtual currency data" may refer to any data that is associated with a virtual currency account. For example, the virtual currency data may identify a virtual currency account or may include information associated with a virtual currency account. For instance, virtual currency data may be composed of account data, including an account number and an account balance, for a virtual currency account.

The term "transaction payload" may refer to a data portion of a network protocol packet. In some embodiments of the present invention, the transaction payload may include transaction data for a financial transaction (e.g., payment data, transaction total, consumer data). The transaction data in the transaction payload may be used for processing the financial transaction. For example, in some embodiments, the transaction payload may be formatted as an ISO 8583 data message. In other embodiments, the transaction payload may include transaction data for a non-financial transaction (e.g., alert data, incentive data, product data, etc.). The transaction data may be in any suitable format and may include any suitable information depending on the purposes of the transaction payload.

The term "message" may refer to any data or information that may be transported from one entity to another entity (e.g., one computing device to another computing device). Further, a message may include a single signal or data packet or a combination of multiple transporting signals. For example, a message may include an analog electrical signal or digital signal that constitutes binary information that may be interpreted as communicating information. Messages may be communicated internally between devices within a secure organization or externally between a device within a secure organization or network to a device outside of a secure organization, area, or communication network. Additionally, messages may be modified, altered, or otherwise changed to comprise encrypted or anonymized information.

The term "issuer identifier" may refer to any information that may be used to identify an entity involved in a transaction. The issuer identifier may typically be associated with the entity that has requested the generation and issuance of virtual currency. The issuer identifier may be for a merchant, a consumer, a payment processing network, or any other entity that requests virtual currency. The issuer identifier can be represented as a series of numeric or alphanumeric characters, or any other types of data. For example, the issuer identifier may be an account number associated with a requestor, or may be a special identifier (generated randomly or according to a predetermined algorithm or code) by a payment processing network performing the virtual currency generation and storage. In some embodiments, the issuer identifier may also be stored in a memory component of a user device. The issuer identifier may be uniquely assigned to each issuer and may be reused for multiple virtual currency issuance requests associated with an issuer.

The term "transaction" may refer to an exchange of interaction between two entities. In some embodiments, a transaction may refer to transfer of value between two users (e.g. individuals or entities). A transaction may involve the exchange of monetary funds, or the exchange of goods or services for monetary funds between two individuals or entities. In other embodiments, a transaction may involve an individual or entity purchasing goods or services from a merchant or other entity in exchange for monetary funds. In other embodiments, the transaction may be a non-financial-related request, such as exchanging of data or information between two entities, such as the transfer of virtual currency data.

The term "virtual currency issuance request message" may include a message sent from one entity to another entity requesting that virtual currency be issued. The entity that requests that virtual currency be issued may be referred to as an issuer. The virtual currency issuance request message may include an amount of virtual currency to be issued, a financial account associated with the requestor to fund the virtual currency, an issuer identifier associated with the requestor, and a consumer identifier and/or consumer account to receive the generated virtual currency. In some embodiments, the virtual currency issuance request message may be a message from one of a merchant, a consumer or a payment processing network. The virtual currency issuance request message may be sent from a computing device associated with the issuer to a payment processing network.

The term "user" may refer to an individual or entity. The user may be a consumer or business entity who is associated with a financial account and whose financial account can be used to conduct financial transactions using a user device (e.g., a mobile device) associated with the financial account.

The term "mobile device" may include a device that can be used to communicate with another device or system. For example, the mobile device may be capable of conducting communications over a network. The communications can include transmission and reception of messages used to conduct a transaction such as, for instance, a purchase of goods or services. The mobile device may be in any suitable form. For example, suitable mobile devices can be handheld and compact so that it can fit into a user's wallet and/or pocket (e.g., pocket-sized). The mobile device can include a processor, and memory, input devices, and output devices, operatively coupled to the processor. Specific examples of mobile devices include cellular or mobile phones, tablet computers personal digital assistants (PDAs), pagers, portable computers, smart cards, and the like. The mobile device may also be referred to as a mobile communication device.

The term "authentication value" may include data used to authenticate a user or a device. The authentication value may consist of a random number or alphanumeric string of characters that may be generated using an algorithm that may be used to determine whether a request (or other message) sent from a device (e.g., a mobile device) is authentic.

The term "database" may include any hardware, software, firmware, or combination thereof, for storing and facilitating the retrieval of information. In addition, the database may use any of a variety of data structures, arrangements, and compilations to store and facilitate the retrieval of information.

The term "settlement file" may refer to a message that is generated and transmitted as part of transaction processing. Settlement files are typically sent in order for a merchant to receive funds for previously-authorized financial transactions. A typical settlement file may include a batch record containing one or more settlement records, where each settlement record contains payment information for authorized financial transactions. Settlement files may be generated by a merchant computer or issuer computer or any other appropriate computer apparatus. In some embodiments, a settlement message may also be sent by a payment processing network.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

The term "initiating" may include the first steps taken in order to begin a process or the steps conducted in order to complete a process. For example, "initiating the debit of funds from the issuer account" can refer to the actual process required to complete the action relating to debiting funds from a financial account associated with an issuer of virtual currency. However, "initiating the debit of funds from the issuer account" can also refer to the process of sending a message from the server computer to the issuer computer, with instructions for performing the process required to complete the action relating to debiting funds from a financial account associated with an issuer of virtual currency.

The term "payment processing network" may refer to a network that includes or operates at least one server computer used for payment processing. In some embodiments, the server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. In some embodiments, the payment processing network may operate multiple server computers. In such embodiments, each server computer may be configured to process transaction for a given region or handles transactions of a specific type based on transaction data. The server computer may be referred to as a "payment processing server."

The payment processing network may include data processing subsystems, networks, and operations used to support and deliver authorization services, exception file services, and clearing and settlement services. An exemplary payment processing network may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system, which performs clearing and settlement services. The payment processing network may use any suitable wired or wireless network, including the Internet.

The payment processing network may process transaction request messages and determine the appropriate destination (e.g., issuer computer) for the transaction request messages. The payment processing network may also handle and/or facilitate the clearing and settlement of transactions.

B. SYSTEMS

FIG. 1 shows a transaction processing system according to an embodiment of the present invention. The system 100 may be used to facilitate the communications of data between a mobile device 102 and a payment processing network 114. The system 100 includes traditional transaction-related entities including a merchant 104, an acquirer 106, an issuer 112, and the payment processing network 114 (which may include one or more payment processing network server computers 108a and 108b serving a single payment processing network 114). The system 100 also includes a mobile device 102 and location-aware infrastructure: a location terminal 116, a location proxy 118, and an internet controller 120, which may be used to receive and send data included in a network protocol header portion of a network protocol message. Each of these systems and computers may be in operative communication with each other. For simplicity of illustration, a certain number of components are shown is shown in FIG. 1. It is understood, however, that embodiments of the present invention may include more than one of each component. In addition, some embodiments of the present invention may include fewer than all of the components shown in FIG. 1.

The mobile device 102 may be in any suitable form. For example, suitable mobile devices 102 can be hand-held and compact so that they can fit into a consumer's pocket (e.g., pocket-sized). The mobile device 102 can include a processor, and memory, input devices, and output devices, operatively coupled to the processor. Specific examples of portable consumer devices include cellular or wireless phones, personal digital assistants (PDAs), pagers, portable computers, smart cards, and the like.

In a typical transaction, a consumer associated with the mobile device 102 may purchase a good or service at the merchant 104 using the mobile device 102. For example, the consumer may pass the mobile device 102 near a contactless reader or through a contact reader in a POS terminal at the merchant 104. In other embodiments, the consumer associated with the mobile device 102 may be moving through a merchant location and data may be retrieved from the mobile device 102 by one or more locational terminals 116. In other embodiments, the consumer may access a mobile application stored on the mobile device 102 to perform a transaction with the merchant 104. In such embodiments, the mobile device 102 may be configured to transmit device and/or consumer data to the payment processing network through the POS terminal.

An issuer computer 112 is typically associated with a business entity (e.g., a bank) which issues and maintains consumer accounts for a consumer. The issuer computer may issue payment devices for the consumer account including credit cards, debit cards, etc., and/or may provide consumer accounts stored and accessible via the mobile device 102 of the consumer. An acquirer computer 106 is typically associated with a business entity (e.g., a commercial bank) that has a business relationship with a particular merchant or other entity and that may be involved in the process of transaction. The acquirer computer 106 may issue and manage accounts for merchants and exchange funds with the issuer computer 112 on behalf of the merchant. Some entities can perform both issuer computer and acquirer computer functions. Embodiments of the present invention encompass such single entity issuer-acquirer computers. The payment processing network 114 may provide transaction authorization and clearing and settlement services between the acquirer computer 106 and the issuer computer 112 for standard payment transactions.

The location terminal 116 may include a processor and a computer readable medium coupled to the processor, the computer readable medium comprising code, executable by the processor for performing the functionality described below. The location terminal 116 may be a sensing apparatus configured to detect the presence of the mobile device 102 at or near a merchant location. In some embodiments, the location terminal 116 may be a standalone device located at a merchant 104. In other embodiments, the location terminal 116 may contained within a POS terminal at the merchant 104. A merchant 104 may have one or more location terminals 116 within a merchant location. The location terminal 116 may be configured to collect information (e.g., consumer identifier, device identifier, virtual currency token identifier, issuer identifier, and payment data) associated with or stored in a memory within the mobile device 102.

In some embodiments, the mobile device 102 may include an application configured to send the information stored in the memory of the mobile device 102, to the location terminal 116. For example, in some embodiments, consumer presence may be detected when a consumer is at or near the location terminal 116, and the credentials associated with the consumer (e.g., a payment processing network SIM card) may be collected by the location terminal 116. The information collected by the location terminal 116 may be used for multiple purposes, including risk analysis, fraud detection, authentication/verification, advertisements and incentives monitoring or generation, payment/transaction processing, etc. Although discussed in terms of merchant use, the location terminal 116 is not limited only to applications at merchants and may be implemented by any entity, as one of ordinary skill in the art would recognize.

The location proxy 118 may include a processor and a computer readable medium coupled to the processor, the computer readable medium comprising code, executable by the processor for performing the functionality described below. The location proxy 118 may be a merchant communications apparatus configured as a merchant proxy for securely providing the information collected by the location terminal 116 to an internet controller 120 of the payment processing network 114. The data may be provided in a network packet, as described in further detail in FIG. 4 below, via any suitable communications network (e.g., the Internet 124). The location proxy 118 may provide secured and certified communications between different modules. In some embodiments, merchant data, device data, and consumer data may also be transmitted to the internet controller 120 via the network packet. The functions of the location proxy 118 may be implemented in hardware or as a plug-in software module.

Communications between the location proxy 118 and the internet controller 120 may be conducted over a communications network (e.g., the Internet 124). The communications network may include a wireless connection, hardwired open network, or closed hardwired network.

The internet controller 120 may include a processor and a computer readable medium coupled to the processor, the computer readable medium comprising code, executable by the processor for performing the functionality described below. The internet controller 120 may be configured as a controller that communicates with various location proxies 118 (each typically from a different merchant or merchant location) to aggregate consumer and/or transaction information over the Internet 124 (or any other suitable communications network or medium) on behalf of a payment processing network 114. In some embodiments, the internet controller 120 may provide additional services in transaction processing including: parsing various identifiers from a network header portion of a network protocol packet, validating transactions, and performing additional analyses using the data included in the network header portion. In some embodiments, the internet controller 120 is a module within the payment processing network 114. In other embodiments, the internet controller 120 is a separate entity from the payment processing network 114 and configured to aggregate and send data to the payment processing network 114.

The protocol conversion module 122 may include a processor and a computer readable medium coupled to the processor, the computer readable medium comprising code, executable by the processor for performing the functionality described below. The protocol conversion module 122 may be configured to convert data messages from a first protocol to a second protocol. In some embodiments, different mobile networks may utilize different protocols for sending and receiving data. In order to provide interoperability (e.g., communications) between mobile networks utilizing different protocols, the protocol conversion module may be required to convert the protocol used by a source computing device to the protocol used by a destination computing device. The conversion may be accomplished by encapsulating a data signal in a first protocol into a second data signal in a second protocol. For example, the protocol conversion module may encapsulate a data message sent in an internet protocol within an SS7 protocol message. This may facilitate the transmission of the data message sent through a mobile network system.

In some embodiments of the present invention, communications between the payment processing network 114 and the mobile device 102 may be conducted through a network such as the Internet 124. In other embodiments, the communications between the payment processing network 114 and the mobile device 102 may be conducted through a mobile network 110 via the protocol conversion module 122.

Figure 2:
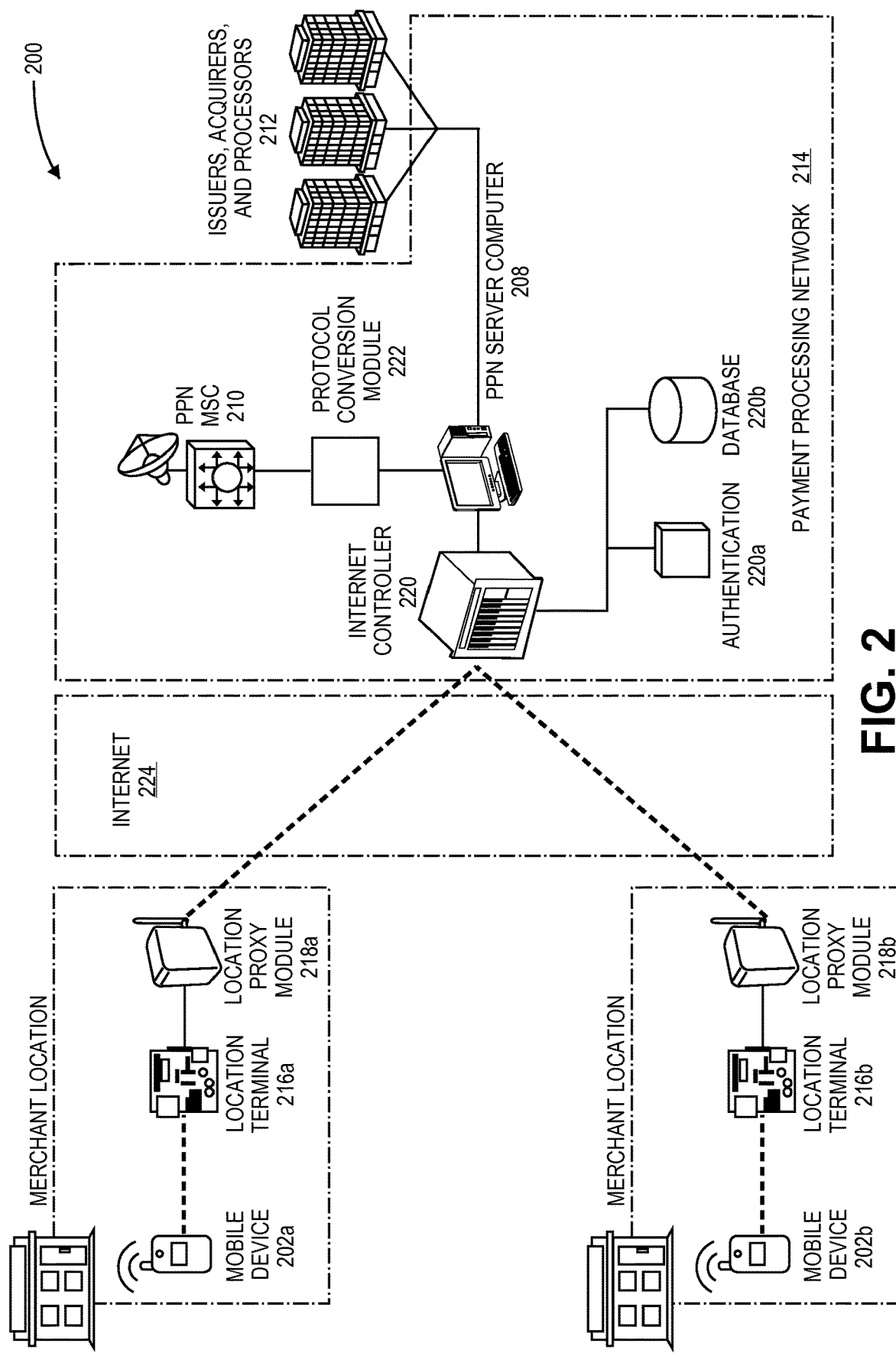
FIG. 2 shows a detailed system diagram for a system for processing transactions according to an embodiment of the present invention.

FIG. 2 shows a detailed system diagram 200 for a transaction processing system 200 according to an embodiment of the present invention. The system 200 illustrates how each merchant location may aggregate the data specific to its location via location terminals (216a and 216b) and location proxies (218a and 218b), and transmit the data over the Internet 224 to an internet controller 220 associated with a payment processing network 214. Each merchant location in FIG. 2 may be associated with the same merchant or may be associated with different merchants. For example, a merchant may have a plurality of locations and one location proxy module 218a may be used to aggregate the data for the plurality of locations, or each one of the plurality of locations may include its own location proxy module 218a.

Figure 4:
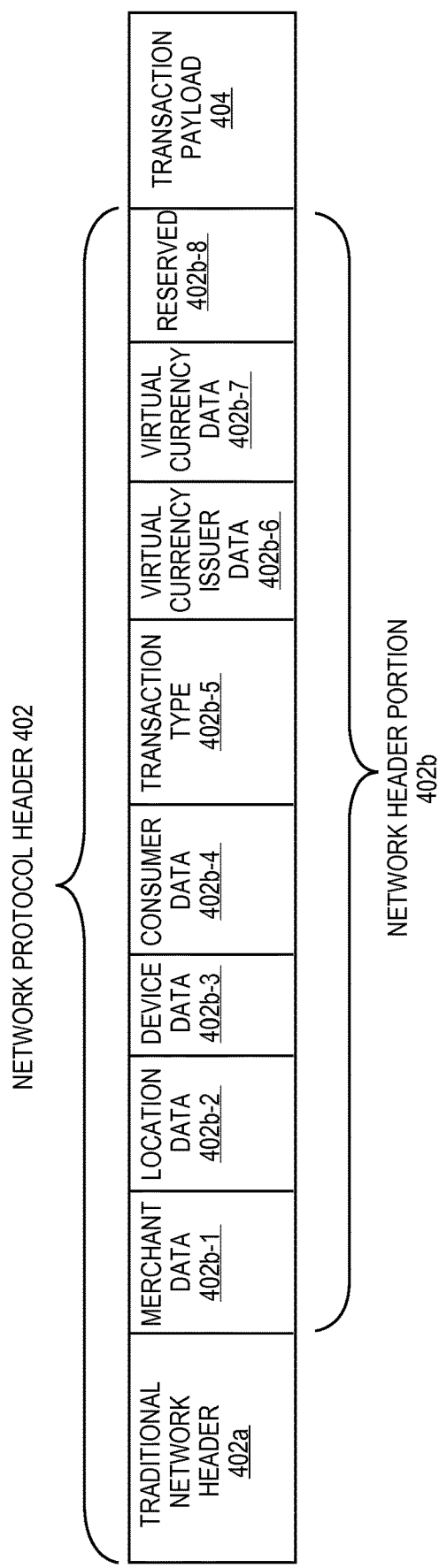
FIG. 4 shows a diagram of a network protocol packet according to an embodiment of the present invention

The internet controller 220 may analyze the data and information received from each location proxy 218a and determine how to process the transactions being conducted using each of the mobile devices (202a and 202b). For example, the internet controller 200 may determine a transaction type for the transaction based on transaction type data received in a network protocol packet (as shown in FIG. 4).

Figure 5:
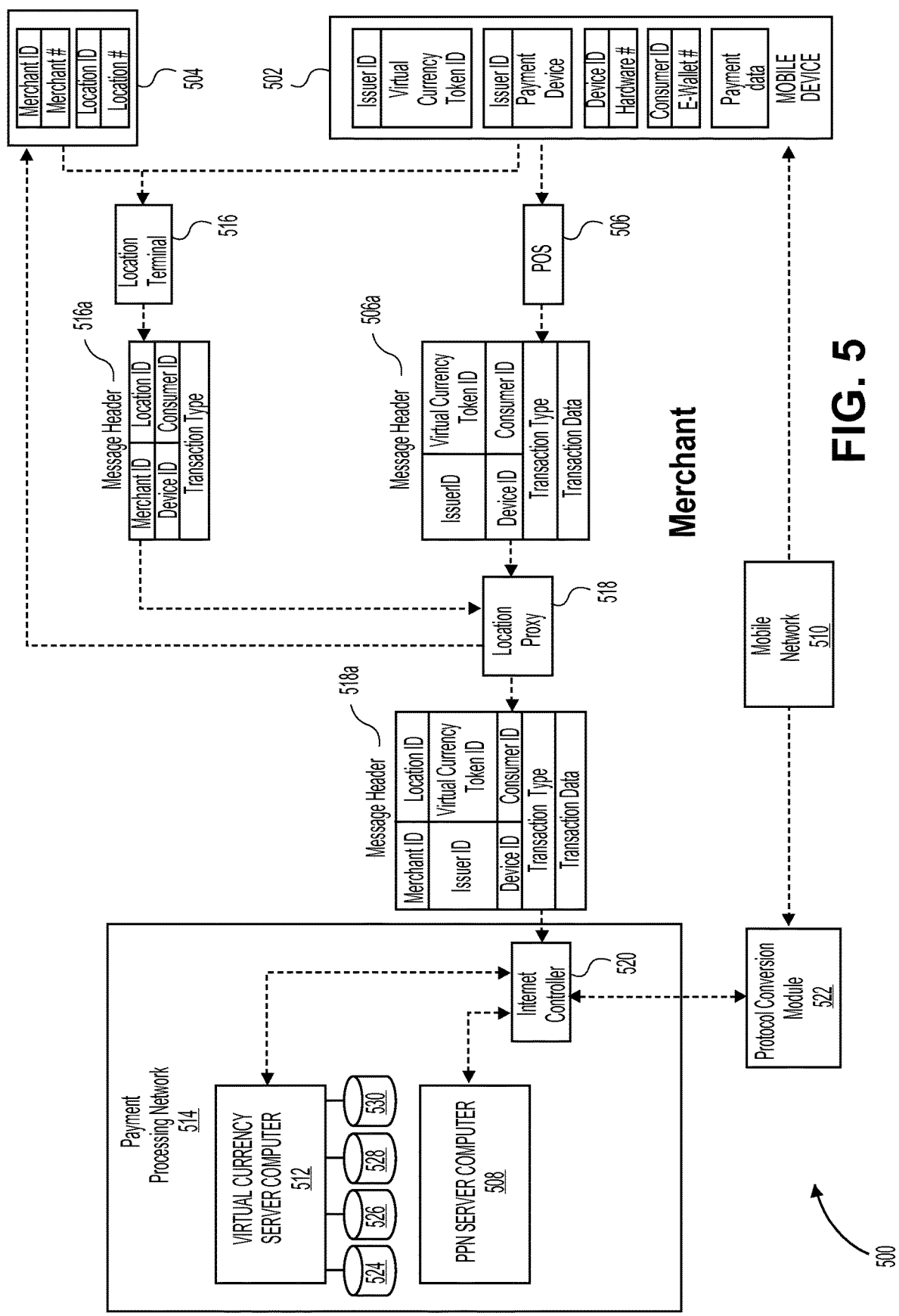
FIG. 5 shows a detailed diagram of the data flow using an exemplary network protocol infrastructure according to an embodiment of the present invention.

In some embodiments, the PPN server computer 208 may be a virtual currency server computer. In such embodiments, if the transaction type indicates that the transaction is a transaction using virtual currency, the internet controller 220 may route the transaction to the virtual currency server computer for transaction processing (as shown in FIG. 5). In such embodiments, as the virtual currency accounts are managed by the payment processing network 514, the transaction may be processed through the virtual currency server computer 512 without requiring the use of an issuing bank or acquiring bank. Further details on the virtual currency server computer 512 are described with respect to FIGS. 5-10.

In other embodiments, if the transaction type indicates that the transaction is a standard transaction using a payment device (e.g., a credit card or debit card), the internet controller 220 may route the transaction to the PPN server computer 208 for transaction processing. The payment processing network 214 may be associated with a payment gateway of issuers, acquirers and processors 212 that performs steps for authorizing the transaction associated with the transaction data (e.g., authorizing the transaction associated with an authorization request message). In such embodiments, an authorization response message may be transmitted by the PPN mobile switching center 210 to the mobile device 202a associated with the consumer. The payment gateway of issuers, acquirers and processors 212 may also be configured to store and provide data for consumer-targeted messages including alerts, notifications, coupons, advertisements, and rewards data. The data for the consumer-targeted messages may be stored in databases accessible through the payment gateway of issuers, acquirers and processors 212.

In other embodiments, if the transaction type indicates that the transaction is for a non-financial transaction (e.g., related to the issuance of consumer-targeted messages, including notification messages, coupons, and alert messages), the internet controller 220 may complete an action associated with the type of non-financial transaction. For example, the internet controller may generate a coupon (e.g., 20% off total purchase) for the consumer associated with the mobile device (202a and 202b). The coupon may be generated for use at the merchant location. In some embodiments, the coupon offer may be generated based on the consumer's profile (e.g., purchase history at that merchant location). For example, the consumer profile may be stored in a consumer database (524 in FIG. 5) accessible by the internet controller 220. The consumer database 524 may include the consumer profile entries described in further detail below in reference to FIG. 8. In another example, the internet controller 220 may generate an advertisement for a sale occurring at the merchant location that may be transmitted to the mobile device (202a and 202b). In yet another example, the internet controller 220 may transmit a list of businesses (e.g., food vendors, banks, movie theaters, shopping malls) in proximity to the merchant location to the mobile device (202a and 202b).

In embodiments of the present invention, the internet controller 220 may transmit a data message back to the mobile device 202a via a communications network. For example, the data message may include a targeted offer (e.g., coupon, advertisement) for the consumer associated with the mobile device 202a. The data message may be sent to the mobile device 202a through the payment processing network (PPN) mobile switching center (MSC) 210 associated with the payment processing network 214. In such embodiments, the data message may be sent from the PPN server computer 208, through a protocol conversion module 222, and across a PPN mobile network as described in U.S. patent application Ser. No. 14/173,718, titled, "INTEGRATED COMMUNICATIONS NETWORK FOR TRANSACTION," which is herein incorporated by reference in its entirety for all purposes. In alternative embodiments, the data message may be sent through a third party mobile network. Additionally, in some embodiments, the internet controller 220 may send the data message through an internet protocol to the location proxy 218a to provide the coupon to the consumer through the location terminal 216a (e.g., merchant POS terminal or access device).

Figure 3:
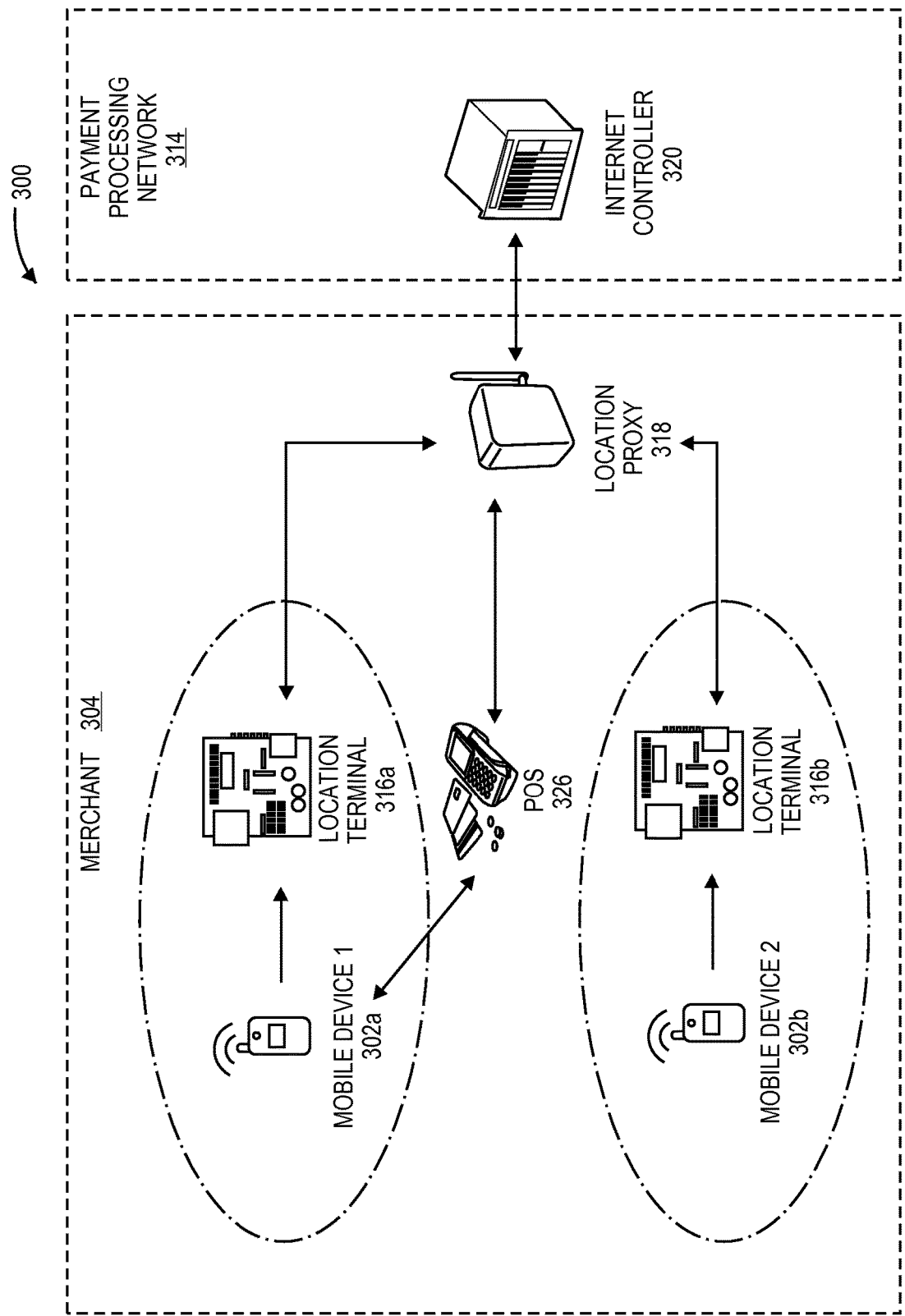
FIG. 3 shows a block diagram illustrating the interaction of multiple transaction processing devices and mobile devices in an exemplary transaction processing system according to an embodiment of the present invention.

FIG. 3 shows a block diagram illustrating the interaction of multiple transaction processing devices and mobile devices in an exemplary transaction processing system according to an embodiment of the invention. FIG. 3 illustrates the collection of location data and transaction data at a merchant 304 using a plurality of location terminals (316a and 316b), a location proxy 318, and a POS terminal 326. Each location terminal (316a and 316b) may have a specific coverage area within a merchant location 304, as depicted by the elliptical shaped regions surrounding each location terminal (316a and 316b). Mobile devices located within the elliptical shaped regions may communicate with or be accessed by the corresponding location terminal (316a and 316b). For example, mobile device 1 302a is within the range of (or in proximity to) location terminal 316a, while mobile device 2 302b is within the range of (or in proximity to) location terminal 316b.

In some embodiments of the present invention, the location terminals (316a and 316b) may collect or be preconfigured with merchant data (e.g., merchant identifier, location identifier). The location terminals (316a and 316b) may also collect device data and consumer data from the mobile devices (302a and 302b) (e.g., device identifier, consumer identifier). The data retrieved by the location terminals (316a and 316b) may then be sent to the location proxy 318 in a network header to be combined into a network packet. In some embodiments, a merchant 304 may have a plurality of location terminals (316a and 316b) within the merchant location and a location proxy 318 that collects the data from the plurality of location terminals (316a and 316b).

In the example shown in FIG. 3, a transaction may be conducted using mobile device 1 302 via the POS terminal 326 at the merchant 304. The POS terminal 326 may retrieve additional information from mobile device 1 302, including but not limited to, hardware data from mobile device 1 302, and transaction data including an issuer identifier and other payment device data (e.g., payment account number). The POS terminal may also retrieve virtual currency issuer data and virtual currency data from mobile device 1302, including a virtual currency token identifier. The POS terminal 326 may send the retrieved data and a transaction type indicator with the transaction data to the location proxy 318. The data may be sent in a network packet 400 formatted as shown in FIG. 4. In some embodiments of the present invention, the location proxy 318 may associate the data for mobile device 1 302 retrieved by the location terminal 316a with the data for mobile device 1 302 and the transaction data retrieved from the POS terminal 326. The data from the location terminal 316a and the data from the POS terminal 326 may be associated based on a device identifier or consumer identifier common to the data retrieved from the location terminal 316a and the POS terminal 326.

The data may then be packaged into a network header portion and sent in a network protocol packet to the internet controller 320 located at the payment processing network 314. As noted previously, in some embodiments, the internet controller 320 may be a separate entity from the payment processing network 320.

FIG. 4 shows a diagram of a network protocol packet 400 according to an embodiment of the invention. The network protocol packet 400 may include a network protocol header (e.g., control portion) 402 and a transaction payload (e.g., transaction data including, for example, an ISO 8583 data message) 404. In some embodiments of the present invention, the network protocol header 402 may include a traditional network header 402a and a network header portion 402b. The traditional network header 402a may include, for example, source and destination addresses (MAC and/or internet protocol addresses) and similar data used for routing the network protocol packet 400. According to the embodiment as shown in FIG. 4, the network header portion 402b is appended to the traditional network header 402a. In some embodiments, the network header portion 402b can be prepended to the traditional network header 402a, or be inserted in between fields of the traditional network header 402a (e.g., in between source and destination addresses). In some embodiments, an existing field or fields of the traditional network header 402a can be repurposed for the network header portion 402b. For example, the options field of an internet protocol (IP) packet header can be used for the network header portion 402b.

According to some embodiments, appending the network header portion 402b to the traditional network header 402a, or repurposing an existing field or fields of the traditional network header 402a may allow the network protocol packet 400 to be used with existing network equipment. Existing network equipment that may not necessarily have functionalities to process the additional data in the network header portion 402b could thus still parse the beginning portions of the network protocol packet 400 to perform networking functions (e.g., to obtain source and destination addresses to route the packet). In embodiments in which the network header portion 402b is prepended or inserted in the traditional network header 402a, the network equipment receiving the network protocol packet 400 can be updated to recognize the modified header format.

In embodiments of the present invention, the network header portion 402b may include data retrieved by the location terminals (216a and 216b) and the POS terminal 206, as described above. The retrieved data may include one or more of merchant data, location data, device data, consumer data, transaction type data, virtual currency issuer data, and virtual currency data. In some embodiments, for example, the network protocol packet may be an IP/TCP protocol packet. Merchant data including a merchant identifier and/or a merchant location may be stored in a merchant data portion 402b-1 of the network header portion 402b. Location data including a location identifier (e.g., physical or internet address, location coordinates) may be stored in a location data portion 402b-2 of the network header portion 402b. Device data including a hardware identifier (e.g., MAC address, IMEI) may be stored in a device data portion 402b-3 of the network header portion 402b. Consumer data including a consumer identifier (e.g., e-wallet account, email address, phone number) may be stored in a consumer data portion 402b-4 of the network header portion 402b. Transaction type data indicating whether the transaction is a non-financial transaction (e.g., coupon request or account information request) or a financial transaction (e.g., purchase transaction) as well as the type of financial or non-financial transaction, may be stored in a transaction type portion 402b-5 of the network header portion 402b. Virtual currency issuer data including an issuer identifier (e.g., a unique identifier assigned by the payment processing network to a virtual currency requester) may be stored in a virtual currency issuer data portion 402b-6 of the network header portion 402b. Virtual currency data including a virtual currency token identifier (e.g., a unique identifier provided by the payment processing network for the consumer to use in a financial transaction) may be stored in a virtual currency data portion 402b-7 of the network header portion 402b.

The network header portion 402b may further include a reserved field 402b-8 for additional data that may be relevant to verifying or validating a transaction, targeting a consumer, or any other purposes of embodiments of the present invention. Other embodiments of the present invention may include all of the fields described above, fewer fields, or additional fields, as one of ordinary skill in the art would recognize.

The transaction payload portion 404 of the network protocol packet 400 may contain the transaction data for a transaction conducted using the mobile device 202a. For example, the transaction data may be sent from the POS terminal 206 as part of the authorization process for the transaction. In some embodiments of the present invention, the transaction data in the transaction payload portion 404 may be in an ISO 8583 message. ISO 8583 specifies a common message interface that allows financial data messages for a transaction to be interchanged between acquirers, issuers, and payment processing networks.

In other embodiments, the data in the transaction payload portion 404 may be in any other suitable format and may include non-financial transaction data. For example, the transaction payload portion 404 may include data for alert or notification generation, product information, etc. The transaction payload may include any data being sent between devices, including, for example, mobile devices, televisions, point of sale devices, automobiles, etc.

As depicted in FIG. 4, the network header portion 402 in the network protocol packet 400 is located following the traditional network header 402a. In such embodiments, as the location of the traditional network header 402a is not modified, network devices can process the network protocol header 402a without additional software or configuration data or changes to the network infrastructure. In alternative embodiments, the network header portion 402 may be placed preceding the traditional network header 402a. In such embodiments, in order to process the network protocol header 400, network devices may require updated software or configuration data enabling the network devices to recognize the format of the network protocol packet 400.

FIG. 5 shows a detailed diagram 500 of the data flow using an exemplary network protocol infrastructure according to an embodiment of the present invention. FIG. 5 shows the data that may be included in the network header portion of the network packet depicted in FIG. 4. The diagram 500 includes a mobile device 502, a POS terminal 506, a mobile network 510, a payment processing network 514, a location terminal 516, a location proxy 518, an internet controller 520, and a protocol conversion module 522.

The payment processing network 514 may further include a payment processing network (PPN) server computer 508 to facilitate transaction processing. The internet controller 520 may be a module within the payment processing network 514 and may be operably connected to the payment processing network server computer 508 and a virtual currency server computer 512. The virtual currency server computer 512 may be operably connected to plurality of databases including an issuer database 524, a consumer database 526, a merchant database 528, and a transaction database 530. The databases 524-530 may comprise data received within the network header portion and account information associated with a virtual currency requestor, a merchant, and a consumer. The internet controller 520 may access the data stored in the databases 524-530.

Figure 6:
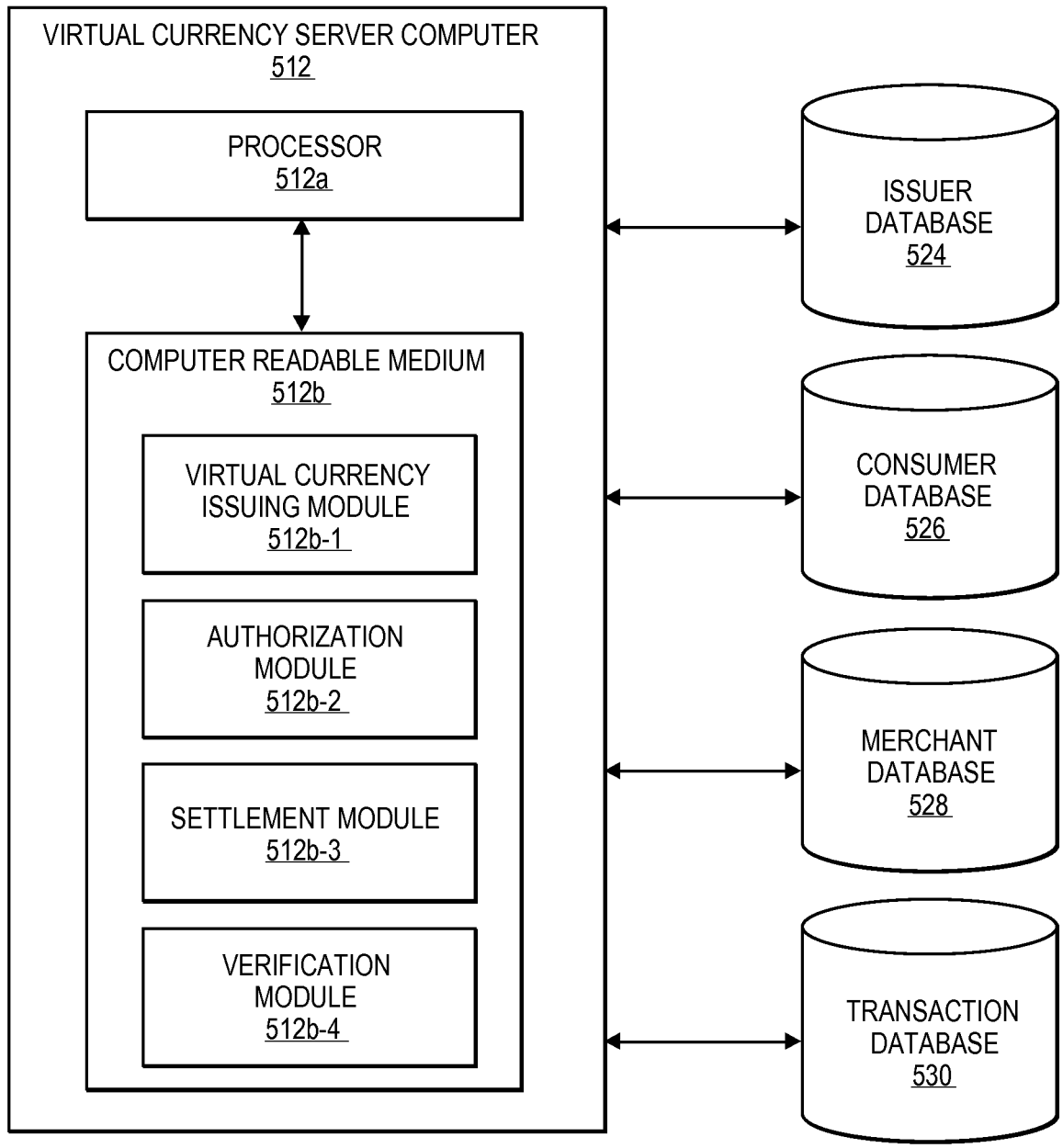
FIG. 6 shows a block diagram of a virtual currency server computer according to an embodiment of the present invention.

FIG. 6 shows a block diagram of a virtual currency server computer 512 according to an embodiment of the present invention. The virtual currency server computer 512 may include a processor and a computer readable medium coupled to the processor, the computer readable medium comprising code, executable by the processor for performing the functionality described below. The virtual currency server computer 512 may include a plurality of software modules stored on the computer readable medium 512b, including a virtual currency issuing module 512b-1, an authorization module 512b-2, a settlement module 512b-3, and a verification module 512b-4. The virtual currency server computer 512 may be operably connected to an issuer database 524, a consumer database 526, a merchant database 528, and a transaction database 530. Additionally, some embodiments of the invention may include fewer than all of the components and modules shown in FIG. 6.

The virtual currency issuing module 512b-1 may include a software module that is configured to process virtual currency issuance request messages received by the payment processing network 514. The virtual currency issuing module 512b-1 may also be configured to generate virtual currency tokens and send virtual currency token identifiers to consumers.

The authorization module 512b-2 may include a software module that is configured to perform processes related to the authorization of financial transactions conducted using virtual currency. The settlement module 512b-3 may be configured to perform processes related to the clearing and settlement of financial transactions conducted using virtual currency.

The verification module 512b-4 may include a software module that is configured to verify and authenticate issuers requesting the issuance of virtual currency, and consumers and merchants associated with financial transaction. The verification and authentication performed by the verification module 512b-4 may be conducted using data received via the network header portion 402b or the network protocol packet 400 and data stored in the issuer database 524, consumer database 526, merchant database 528, and transaction database 530.

Additional details for the modules and the databases are described below with respect to FIGS. 5-10 and the methods described in FIGS. 11-12.

In some embodiments, the verification module 512b-4 may also authenticate a device identifier received in the device data field 402b-3 in a network header portion 402b of a network protocol packet 400 using stored authentication values associated with the device and/or consumer operating the device. In some embodiments, the verification module 512b-4 may also use a consumer identifier (e.g., email address, e-wallet account data, user login) received in a consumer data field 402b-4 in the network header portion 402b of a network protocol packet 400 to authenticate the device and/or consumer. For example, the verification module 512b-4 may access a consumer profile entry in a consumer database 526 and determine whether the device identifier received in the network header portion 402b is associated with the consumer identifier received in the network header portion 402b. If the mobile device and/or consumer are authenticated, the processes and functionality described herein may be completed. If the device or consumer is not authenticated, the functionality and processes may be stopped.

FIG. 7 shows an example issuer database 524 according to an embodiment of the present invention. As shown in FIG. 7, the issuer database 524 may be organized by issuer identifier. In some embodiments, each issuer identifier may have a separate row composed of data associated with the issuer identifier. The issuer database 524 may store data in a plurality of categories, including "Issuer Identifier", "Issuer Account", "Issued Value", "Date of Issuing", "Virtual Currency Token ID", "Merchant Identifier", "Consumer Identifier", and "Acquirer Identifier". Some embodiments may have fewer or additional categories for data. For example, some issuer databases may further include a device identifier column that includes identifying information for a device associated with the virtual currency. In some embodiments, where the virtual currency token is valid for a predetermined length of time, the issuer database may further include an expiration date for the virtual currency token identifier. The values shown in the exemplary issuer database of FIG. 7 are for illustration purposes only and are not meant limit the different types of data and identifiers that may be stored and used in the issuer database.

FIG. 8 shows an example consumer database 526 according to an embodiment of the present invention. As shown in FIG. 8, the consumer database 526 may be organized by consumer identifier. In some embodiments, each consumer identifier may have a separate row composed of data associated with the consumer identifier. The consumer database 526 may store data in a plurality of categories, including "Consumer Account", "Account Value", "Device Identifier", "Virtual Currency Token ID", "Virtual Currency Token Value", "Issuer Identifier", "Merchant Identifier", and "Acquirer Identifier". Some embodiments may have fewer or additional categories for data. The values shown in the exemplary consumer database of FIG. 8 are for illustration purposes only and are not meant to limit the different types of data and identifiers that may be stored and used in the consumer database.

FIG. 9 shows an example merchant database 528 according to an embodiment of the present invention. As shown in FIG. 9, the merchant database 528 may be organized by merchant identifier. In some embodiments, each merchant identifier may have a separate row composed of data associated with the merchant identifier. The merchant database 528 may store data in a plurality of categories, including "Merchant Identifier", "Merchant Account", "Account Value", "Location Identifier", "Virtual Currency Token ID", "Issuer Identifier", "Consumer Identifier", and "Acquirer Identifier". Some embodiments may have fewer or additional categories for data. The values shown in the exemplary merchant database of FIG. 9 are for illustration purposes only and are not meant to limit the different types of data and identifiers that may be stored and used in the merchant database.

FIG. 10 shows an example transaction database 530 according to an embodiment of the present invention. As shown in FIG. 10, the transaction database 530 may be organized by transaction identifier. In some embodiments, each transaction identifier may have a separate row composed of data associated with the transaction identifier. The transaction database 530 may store data in a plurality of categories, including "Transaction Identifier", "Transaction Amount", "Transaction Time", "Virtual Currency Token ID", "Issuer Identifier", "Consumer Identifier", "Merchant Identifier", "Location Identifier", "Geo Coordinates", "Device Identifier", and "Acquirer Identifier". Some embodiments may have fewer or additional categories for data. The values shown in the exemplary transaction database of FIG. 10 are for illustration purposes only and are not meant to limit the different types of data and identifiers that may be stored and used in the transaction database.

The data contained in the issuer database 524, consumer database 526, merchant database 528, and transaction database 530 may be received by the payment processing network 514 via network protocol packets 400 associated with messages from issuers, merchants, and consumers. In some embodiments, some of the data may be generated or received through an enrollment process with a virtual currency system centrally operated by the payment processing network 514.

The data stored in the issuer database 524, the consumer database 526, the merchant database 528, and the transaction database 530 may be used for authentication by the verification module 512b-4, as well as by the internet controller 520 for validating transactions. The data stored in the databases 524-530 may be modified or updated when virtual currency is requested by issuers, virtual currency tokens are requested by consumers, when transactions using the virtual currency tokens are performed, and when transactions are settled. In addition, the data stored in the databases 524-530 may be used to generate transaction histories for a merchant, consumer, or for issued virtual currency, for transactions both conducted with or without virtual currency.

The internet controller 520 may also validate a transaction by associating the data extracted from the network header portion 402b for the transaction with issuer profiles, consumer profiles, and merchant profiles stored in the issuer database 524, the consumer database 526, the merchant database 528, respectively. The internet controller 520 may compare the data associated with the current transaction to the data stored in the databases 524-530 in order to obtain additional information about the consumer, the merchant, the issuer, the transaction, and their authenticity. This process may be achieved through any suitable analysis, as one of ordinary skill in the art would understand. Further, note that although FIGS. 5-10 show the various databases as separate databases, in some embodiments, all of the information could be stored in a single database or additional databases.

C. METHODS

Methods according to embodiments of the invention can be described with respect to FIGS. 1-10. Embodiments of the present invention may be capable of performing methods including (1) issuing virtual currency, (2) requesting a virtual currency token, (3) processing a transaction using a virtual currency token, and (4) settling a transaction using virtual currency. Additional methods and processes may be included within these methods and may be recognized by one of ordinary skill in the art, in light of the description below. Further, in some embodiments of the present invention, the described methods may be combined, mixed, and matched, as one of ordinary skill would recognize.

1. Issuing Virtual Currency

Figure 11:
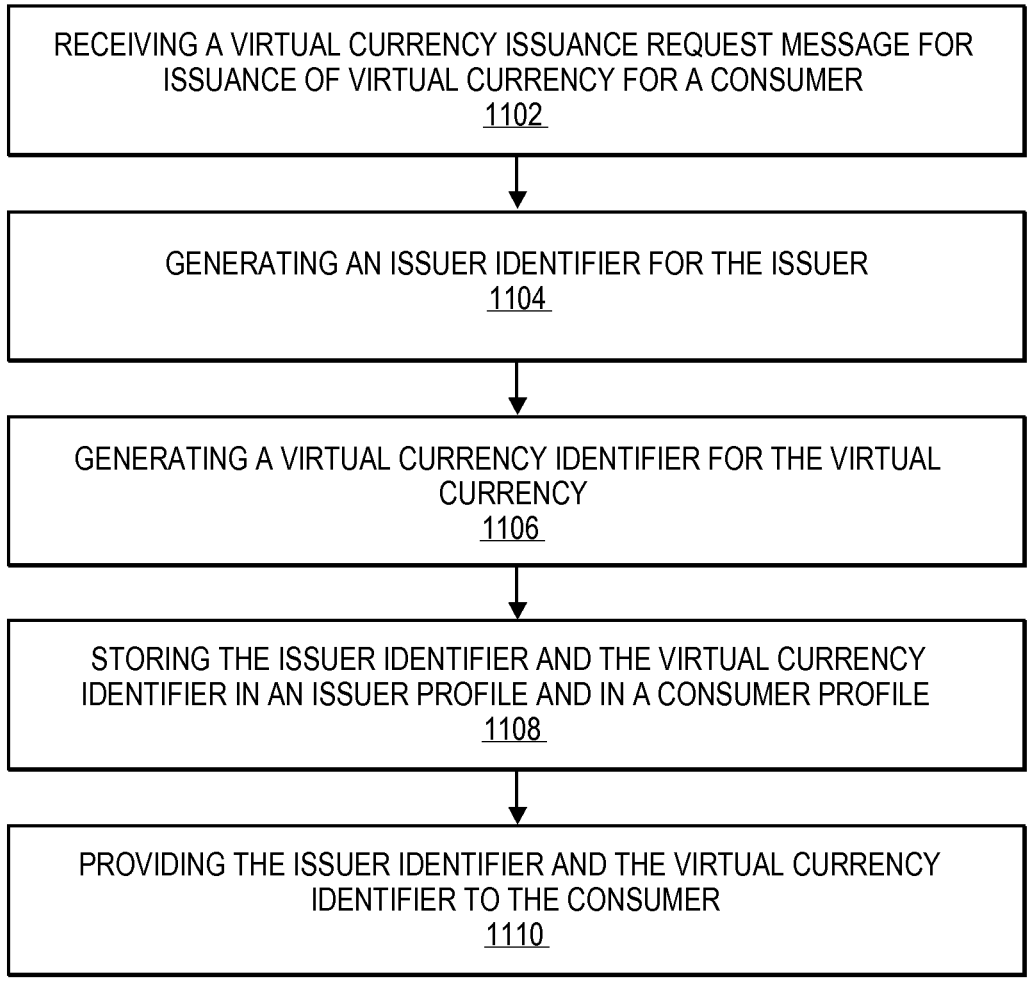
FIG. 11 shows a flowchart describing an exemplary method of using a network protocol header infrastructure to generate and issue virtual currency according to an embodiment of the present invention.

FIG. 11 shows a flowchart describing an exemplary method of using a network protocol header infrastructure to generate and issue virtual currency according to an embodiment of the present invention. The embodiment described in FIG. 11 relates to the generation and issuance of virtual currency requested by a merchant. In other embodiments, the virtual currency request may originate from another entity, including a consumer or a payment processing network. The entity making the request for issuance of virtual currency is referred to as an issuer for the purposes of this invention. The embodiment described in the method of FIG. 11 describes the request for issuance of virtual currency for a single consumer. However, embodiments of the present invention contemplate request messages that may be comprised of a plurality of virtual currency issuance requests for a plurality of consumers.

In step 1102, the server computer 512 receives a virtual currency issuance request message for issuance of virtual currency. The virtual currency issuance request message may be from a requestor (e.g., a virtual currency issuer or issuer) for the issuance of virtual currency to be given to a consumer. For example, a requestor may be a merchant that would like to distribute loyalty points with a set value to a consumer, such as reward points. As an example, a merchant may want to have 1000 units of virtual currency issued to a consumer. In another example, a merchant may want to have 1000 units of virtual currency issued to each of a plurality of consumers.

In embodiments of the present invention, the virtual currency server computer 512 may receive the virtual currency request message from a consumer or a merchant via the virtual currency server computer 512 via an internet controller 520. In some embodiments, the virtual currency server computer 512 may receive the virtual currency request message from a consumer or a merchant via a web-based portal (e.g., website) or using a software application stored on a memory of the mobile device 502. In other embodiments, the virtual currency request message may be from a payment processing network 514 associated with the virtual currency server computer 512.

The virtual currency issuance request message may be in received as part of a network protocol packet 400, as depicted in FIG. 4. The virtual currency issuance request message may include fields for merchant data 402b-1, location data 402b-2, device data 402b-3, consumer data 402b-4, transaction type 402b-5, virtual currency issuer data 402b-6, and virtual currency data 402b-7. One or more of these fields may contain data in the virtual currency issuance request message. For example, if the virtual currency issuance request message is from a merchant, all of the fields listed above may contain data. However, if the virtual currency issuance request message is from a consumer, the virtual currency issuance request message may only contain device data 402b-3, consumer data 402b-4 and transaction type data 402b-6. In some embodiments, the virtual currency issuance request message may also include an account identifier for an issuer account for funding of the virtual currency amount requested by the issuer. For example, the account identifier may be a financial account number associated with the issuer.

In step 1104, the server computer 512 generates an issuer identifier for the issuer. In embodiments of the present invention, in order to track the issuance and usage of virtual currency generated by the payment processing network 514, the issuer (e.g., requestor) of the virtual currency may be assigned a unique issuer identifier by the payment processing network 514.

In some embodiments, the server computer 512 may generate issuer identifiers for other issuers of payment devices. For example, issuer identifiers may be associated with issuers of credit cards, debit card, stored value cards, coupons, and rewards points. Associating issuer identifiers with other entities beyond virtual currency requestors may be performed through an enrollment process whereby issuers provide their information to the payment processing network 514 in order to be issued an issuer identifier. By assigning an issuer identifier to all issuers, the server computer 512 in the payment processing network 514 may be able to track and associate all transactions that are processed through the payment processing network 514. The use of issuer identifiers for all issuers may add an additional layer of security for transactions as it provides another means of authenticating a party to a transaction.

In step 1106, the server computer 512 generates a virtual currency identifier for the virtual currency. The virtual currency issuing module 512b-1 may generate a virtual currency identifier associated with the transaction performed to create virtual currency. The virtual currency identifier may be associated with the issuer identifier and stored in the issuer database 524. In some embodiments, the virtual currency identifier may be a record for the transaction. In some embodiments, the virtual currency identifier may be associated with the issuer identifier in order for the system to track usage of the virtual currency in later transactions.

In step 1108, the server computer 512 stores the issuer identifier and the virtual currency identifier in an issuer profile associated with the issuer. When the virtual currency issuing module 512b-1 has generated the issuer identifier and the virtual currency identifier, the virtual currency issuing module 512b-1 may access the issuer database 524.

The virtual currency issuing module 512b-1 may generate an issuer profile entry in the issuer database 524 using the issuer identifier.

In some embodiments, where the issuer has previously been assigned an issuer identifier (e.g., through a previous enrollment or during a prior virtual currency issuance request process), the server computer 512 may perform a verification process using the verification module 512b-4 to determine whether the request was received from the issuer. The verification or authentication process may include comparing data received in the virtual currency issuance request message to a stored data in the issuer database 524. For example, the verification module 512b-4 may determine whether an issuer account matches the assigned issuer identifier in the issuer database 524.

In another example, where the issuer is a merchant, the authentication process may be based on a merchant identifier and a location identifier received in a network header portion 402b of the virtual currency issuance request message.

In step 1110, the server computer 512 provides the issuer identifier and the virtual currency to the consumer. The virtual currency issuing module 512b-1 may generate a consumer profile entry in the consumer database 526 with the consumer identifier (e.g., consumer phone number or other consumer data) contained in the virtual currency issuance request message. In some situations, where the consumer is known to the virtual currency server computer 512 (e.g., from a prior transaction), a consumer profile entry may exist in the consumer database 526. In such situations, the virtual currency issuing module 512b-1 may retrieve and/or access the consumer profile entry associated with the consumer identifier. The consumer profile entry may include the consumer identifier, the issuer identifier, a device identifier, the virtual currency identifier, and virtual currency data including the virtual currency amount.

Providing the issuer identifier and the virtual currency to the consumer may further comprise determining a virtual currency amount requested by the issuer from the virtual currency issuance request message. Using the account identifier included in the virtual currency issuance request message, the virtual currency issuing module 512b-1 may initiate a process to debit funds from the issuer account for the virtual currency amount request by the issuer. The process to debit funds may include sending a settlement message to a financial institution associated with the issuer account for the transfer of funds from the issuer account to the payment processing network 514.

The virtual currency amount is credited to a consumer account associated with the consumer identifier and stored in the consumer database 526 by the virtual currency issuing module 512b-1. The virtual currency may be generated having a number of units equivalent to the requested virtual currency amount. For example, 10 units of virtual currency may be the equivalent of one U.S. Dollar. This may be a fixed exchange rate between virtual currency and U.S. Dollars such that each unit of virtual currency has a fixed monetary value. Other exchange rates between virtual currency and standard currencies (e.g., Euro, Yen, Pounds) may be stored in order to process later transactions performed in other currencies.

As an example, a merchant may want 1000 units of virtual currency issued to a consumer (consumer identifier C1122), where each unit of virtual currency has a fixed monetary value (e.g., $0.01 US Dollar) based on a value exchange rate (e.g., 100-1) with at least one other currency (e.g., US Dollar). The issuer may be assigned issuer identifier I0541 as shown in FIG. 7. The server computer 512 may generate a virtual currency identifier 78521568 for the 1000 units of virtual currency purchased by the issuer associated with issuer identifier I0541. An issuer profile entry may be generated for issuer identifier I0541. The issuer profile entry for issuer identifier I0541 may include all or some of the fields described with respect to FIG. 7. Where issuer I0541 requested the issuance of 100 units ($10) of virtual currency be issued to consumer C1122, the virtual currency issuing module 512b-1 may generate a consumer profile for consumer C1122 and credit 1000 units of virtual currency to the "Account Value" of the consumer account. The consumer profile entry for consumer C1122 may be associated with issuer identifier I0541 (as shown in FIG. 8).

By providing virtual currency to a consumer account that has a fixed monetary value allows the virtual currency requested by multiple issuers to be stored in a single consumer account associated with the consumer identifier. Further, as the virtual currency issued by the virtual currency issuing module 512b-1 has a fixed monetary value, the total value of virtual currency stored in the consumer account can be used for transactions performed at any retailers that conducts transactions through the payment processing network 512. The consumer is thereby not limited to using the virtual currency at selected merchant or partners of merchants, as is typically the case in many current virtual currency systems that are managed by merchants (e.g., airline mileage programs, gas station rewards, grocery store points). This provides greater flexibility for the use of the virtual currency over traditional systems.

2. Requesting a Virtual Currency Token

In some embodiments, before a consumer can perform a transaction using virtual currency stored in a consumer account, the consumer may have to request that the payment processing network 514 generate a virtual currency token and a virtual currency token identifier. The virtual currency issuing module 512b-1 may receive a request for issuance of a virtual currency token for a virtual currency amount from a mobile device 502 of the consumer. When the consumer sends a request for the issuance of a virtual currency token to perform a financial transaction, the virtual currency issuing module 512b-1 may be configured to process the token request. In some embodiments, the consumer may make the token request via a mobile application stored on the consumer's mobile device 502, and the token request may be sent through a mobile network 510 to the payment processing network 514. In other embodiments, the consumer may make the token request via a point of sale terminal at a merchant location. The token request may also be made in other ways, including by phone to an automated system or accessing a website via a browser.

In some embodiments, the token request may be for a specific amount (e.g., the consumer wants to spend $10, which may be equivalent to 1000 units of virtual currency based on a predetermined exchange rate). In other embodiments, the request may not be for a specific amount of virtual currency. The request may be included in a network protocol packet 400 (as shown in FIG. 4). The network protocol packet 400 may include consumer data (e.g., a consumer identifier associated with the consumer), device data (e.g., data identifying the mobile device used by the consumer), virtual currency issuer data (e.g., an issuer identifier that is associated with the virtual currency account stored by the payment processing network).

Prior to processing the token request, the verification module 512b-4 may authenticate the mobile device 502 using the device identifier received in the token request. The verification module 512b-4 may retrieve a consumer profile entry corresponding to the consumer identifier received in the token request. The consumer profile entry may be retrieved from the consumer database 526. The verification module 512b-4 may then determine whether the device identifier associated with the mobile device 502 is included in the list of device identifiers previously associated with the consumer identifier. The list of device identifiers may include all device identifiers associated with the consumer identifier that the consumer has registered with the virtual currency server computer and/or all device identifiers associated with the consumer identifier that have made token requests or have been involved in transactions processed through the payment processing network 514.

The virtual currency issuing module 512b-1 may then determine an account balance for a consumer account associated with the consumer identifier received in the token request. The consumer database 526 may be queried by the virtual currency issuing module 512b-1 with the consumer identifier. The virtual currency issuing module 512b-1 may identify the consumer profile entry associated with the consumer identifier, and the consumer account associated with the consumer and containing virtual currency. An "Account Value" entry associated with the consumer identifier may indicate the account balance for the consumer account. The virtual currency issuing module 512b-1 may then determine whether the account balance is greater than the virtual currency amount requested by the consumer.

When the virtual currency issuing module 512b-1 determines that the account balance in the consumer account is greater than the virtual currency amount (there are sufficient funds in the consumer account to satisfy the token request), the virtual currency issuing module 512b-1 may then generate a first authentication value. The first authentication value may be a random alphanumeric or numeric sequence of characters.

The virtual currency issuing module 512b-1 may then send the first authentication value to the mobile device 502 associated with the token request. The first authentication value may be sent to the mobile device 502 across the mobile network 510. In some embodiments, the communication may be processed through a protocol conversion module 522 in order for the message to be processed and sent by the mobile network 510.

The virtual currency issuing module 512b-1 then receives a second authentication value generated by the mobile device 502 using an algorithm and the first authentication value. The algorithm used to generate the second authentication value may use a shared key or shared hashing function known to the virtual currency issuing module 512b-1 and the mobile device 502.

The verification module 512b-4 may then verify that the received second authentication value matches a stored authentication value generated by the verification module 512b-4 using the same algorithm and the first authentication value.

When the second authentication value matches the stored authentication value, the virtual currency issuing module 512b-1 may then generate a virtual currency token and a virtual currency token identifier associated with the virtual currency token. When the request includes a virtual currency amount, the virtual currency token may be associated with and usable for transactions with a transaction total up to the virtual currency amount. For example, the virtual currency issuing module 512b-1 may generate a virtual currency token identifier, VC8111233, and associate it with 1000 units of virtual currency.

The virtual currency token identifier may be stored with the consumer profile associate with the consumer identifier. Once generated, the virtual currency issuing module 512*b*-1 sends the virtual currency token identifier to the mobile device. The virtual currency token identifier may be stored in a memory or secure element of the mobile device. The virtual currency token identifier may then be accessible using the application stored on the mobile device, and may be usable to perform a transaction.

3. Processing a Transaction Using a Virtual Currency Token

Figure 12:
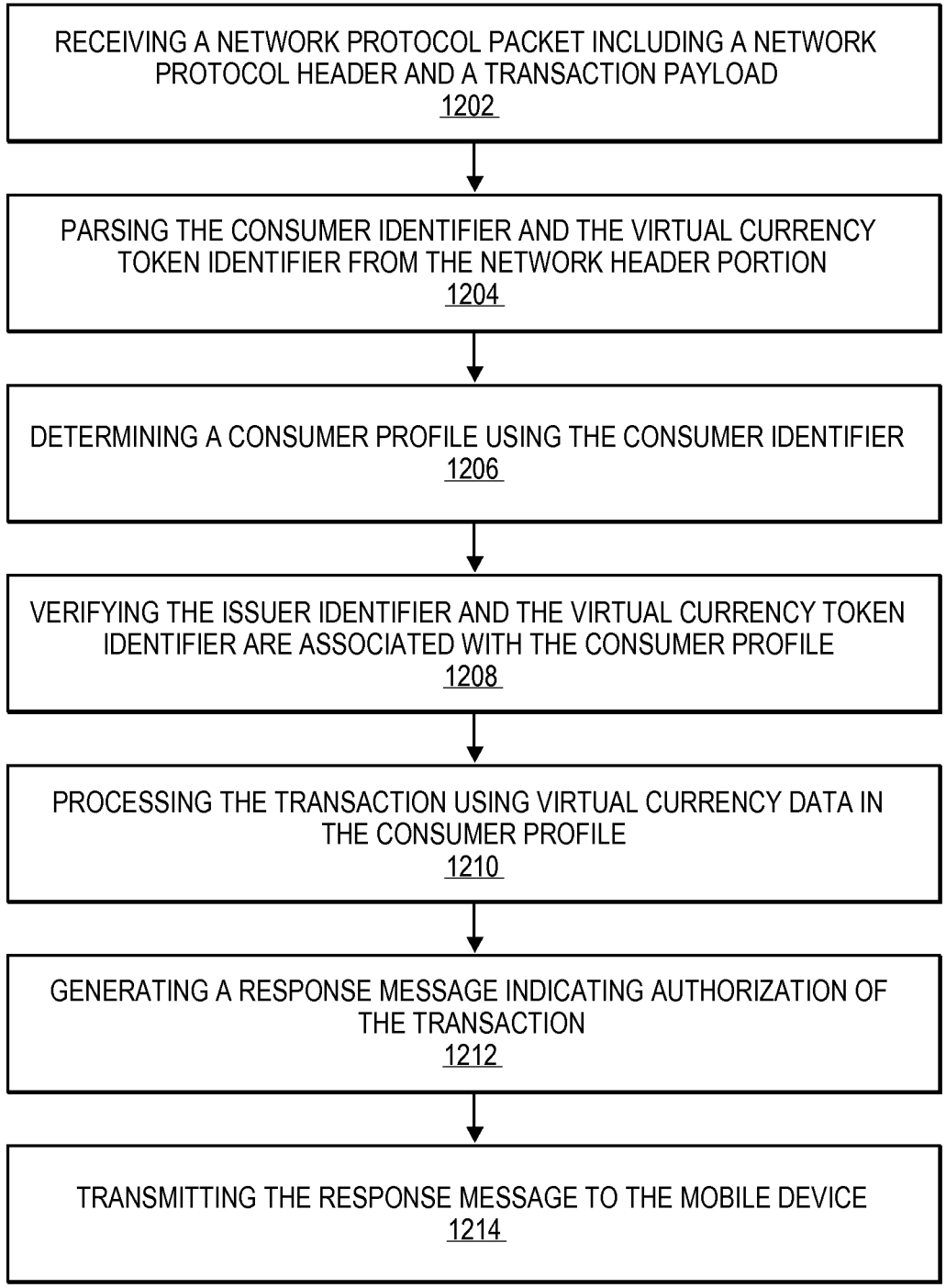
FIG. 12 shows a flowchart describing an exemplary method of using a network protocol header infrastructure to process a transaction using virtual currency according to an embodiment of the present invention.

FIG. 12 shows a flowchart describing an exemplary method of using a network protocol header infrastructure to process a transaction using virtual currency according to an embodiment of the present invention.

In step 1202, the server computer 512 receives a network protocol packet 518*a* including a network protocol header and a transaction payload for the transaction conducted using virtual currency. The network protocol packet 518*a* includes a network header portion. The network header portion may be comprised of an issuer identifier, a virtual currency token identifier, and a consumer identifier. In some embodiments, the network protocol header may further include a device identifier, a location identifier, and a merchant identifier.

The data may be retrieved by a location terminal 516 in proximity to a mobile device 502. In embodiments of the present invention, the internet controller 520 in the payment process network 514 may receive the network protocol packet 518*a*. The network protocol packet 518*a* may include a merchant identifier, a location identifier, a device identifier, the consumer identifier, and a transaction type identifier. In some embodiments of the present invention, a transaction data portion may also be included in the network protocol packet 518*a*. For non-financial transactions, the transaction data portion may not contain any data or may include a flag for indicating that the transaction is a non-financial transaction.

In some embodiments of the present invention, a location terminal 516 may access data on a mobile device 502 to retrieve data for the network protocol packet 518*a*. The location terminal 516 may retrieve data from the mobile device 502 when the mobile device 502 moves into proximity to the location terminal 516. The location terminal 516 may retrieve the merchant identifier, device identifier, location identifier, and consumer identifier from the mobile device 502 and the merchant system 504. Further, the location terminal 516 may provide a transaction type identifier indicating that the transaction is a financial transaction.

The merchant identifier may be a previously assigned identification number for a merchant. In some embodiments, the merchant identifier may be a numeric or alphanumeric value. The location identifier may correspond to a physical address or some other geographic identifier (e.g., latitude and longitude). In one embodiment, the location identifier may correspond to an address of the merchant location or to a specific area or product group within the merchant location. The device identifier may correspond to an identifier of the mobile device 502, such as an IMEI unique to the mobile device 502. In one embodiment, the device identifier may correspond to data stored on a subscriber identity module (SIM) of the mobile device 1002. The consumer identifier may correspond to an identifier of the consumer associated with the mobile device 502. In one embodiment, the consumer identifier may be a digital wallet number, an email address, a phone number, a physical address, a consumer birthdate or other consumer data. The merchant identifier, location identifier, device data, and consumer data may be stored in the database 524-530 associated with the virtual currency server computer 512.

The network protocol packet 516*a* generated by the data retrieved by the location terminal 516 may then be sent to a location proxy 516. In some embodiments, the location proxy 518 may determine whether a POS terminal 506 conducted a transaction with the mobile device 502. The location proxy 518 may then combine the data retrieved by the location terminal 516 and the POS terminal 506 for the network protocol packet 518*a*. The location proxy 518 may then send the network protocol packet 518*a* to the internet controller 520. In some embodiments, the network protocol packet 518*a* may be sent across a communications network (e.g., the Internet).

As an example, a consumer with mobile device 1 302*a* may be moving through a merchant location 304 (as shown in FIG. 3). As mobile device 1 302*a* moves in the coverage area of location terminal 316*a*, the location terminal 316*a* may retrieve data from the mobile device 1 302*a*. The mobile device may periodically transmit mobile communication messages (sometimes called a "ping") that identify the device identifier for mobile device 1 302*a* to any wireless receivers within its transmission range. The location terminal 316*a* may be configured to receive the periodic mobile communication messages and identify the mobile device identifier and the consumer identifier from the message.

The location terminal may store pre-configured or pre-determined merchant data including a merchant identifier identifying the specific merchant associated with the location terminal. In some embodiments, the location terminal may obtain this information from a similar mobile communication message from a local merchant device (e.g. POS). For example, the merchant identifier may be alphanumeric value, e.g., M0222, which may indicate merchant identifier M0222 that may be associated with merchant "Big Box" that has a merchant profile entry in a merchant database 528.

Location data may indicate a specific location associated with the merchant (e.g., "Big Box") 304 and may include a particular store address as well as in some embodiments, the particular aisle, location, or product group of one of many location terminals within the merchant. The location identifier (e.g., M0222-4) may be associated with a specific address (e.g., 9000 Main Street, San Francisco, Calif.) of the merchant identifier (e.g., M0222) associated with the location identifier. Alternatively, the location data may be associated with a particular area, product grouping, or other geographic region within a location to indicate a specific location terminal within the merchant (e.g., M0222-4, indicating location terminal 04 within the store associated with merchant M0222). All of the relevant information associated with the identifiers may be stored at the databases 524-530 associated with the virtual currency server computer 512 to allow the virtual currency server computer 512 to identify and associate received data with a particular merchant, store, location, product grouping, etc. For example, location data M0222-4 may indicate the location terminal associated with the "produce aisle" at the merchant.

The device data may include a device identifier for mobile device 1 302*a* The device identifier may be a phone number (e.g., 415-555-1234) associated with mobile device 1 302*a*, or may be an international mobile subscriber identity (e.g., 310155123456789, where the first three digits ("310") represent the mobile country code, the second three digits ("155") represent the mobile network code, and the remaining digits ("123456789") represent the mobile subscription identifier number within the mobile network's subscriber base. Any other suitable device identifiers may also be used.

The consumer data may include a consumer identifier that may represent identification data related to the consumer. For example, the consumer identifier may be an email address (e.g., janedoe@server.com), user name, social security number, personal data of the consumer (e.g., name, address, birthdate, etc.), or any other unique user information.

The transaction type data may be used to indicate the type of transaction associated with the network header portion. For example, the transaction type data may be an alphanumeric or numeric value indicating whether the transaction is a payment transaction (e.g., purchase of goods or services) or a non-payment transaction (e.g., coupon request or account balance request). For instance, a standard payment transaction may include the transaction type identifier of 0001, a transaction using virtual currency may include the transaction type identifier of 0002, a location tracking transaction may include a transaction type identifier of 0003, and a consumer authentication for access to a secure area may include a transaction type identifier of 0004. Any additional payment and non-payment transaction types may be implemented as one of ordinary skill would recognize.

The virtual currency issuer data may include an issuer identifier that may represent identification data for the entity that initially requested that virtual currency be issued to the consumer. As described previously, the issuer identifier may be assigned to a virtual currency requestor when the virtual currency server computer 512 processes a virtual currency issuance request.

The virtual currency data may include data related to the virtual currency token, including a virtual currency token identifier. The virtual currency token identifier may be used in a transaction and sent in the network protocol packet 400 to allow the virtual currency server computer 512 to identify the virtual currency token that was previously generated at the request of the consumer.

In step 1204, the server computer 512 parses the issuer identifier, the consumer identifier and the virtual currency token identifier from the network header portion. In embodiments of the present invention, the internet controller 520 may receive the network protocol packet 518*a* and parse out the issuer identifier, consumer identifier, and virtual currency token identifier from the network header portion (402*b* as depicted in FIG. 4). In some embodiments, the internet controller 520 may then send the data parsed from the network protocol packet for further processing by the virtual currency server computer 512.

In step 1206, the virtual currency server computer 512 determines a consumer profile using the consumer identifier. The verification module 512*b*-4 may query or access a consumer database 526 with the consumer identifier to retrieve a consumer profile entry associated with the consumer identifier. For example, if the consumer identifier is "C1122", the verification module 512*b*-4 may access and/or retrieve the third consumer profile entry in the consumer database 526, associated with consumer identifier "C1122", shown in FIG. 8.

In step 1208, the virtual currency server computer 512 verifies the issuer identifier and the virtual currency token identifier are associated with the consumer profile. Using the retrieved consumer profile entry associated with the consumer identifier, the verification module 512*b*-4 may verify that the issuer identifier and the virtual currency token identifier are associated with the consumer profile entry. Using the previous example, the verification module 512*b*-4 may verify that issuer identifier I0541 and virtual currency token identifier VC8111233 are associated with the consumer profile entry associated with consumer identifier C1122. If the virtual currency token identifier is associated with the consumer profile entry, the transaction may proceed. If the virtual currency token identifier is not associated with the consumer profile entry, the transaction may be declined or proceed through an alternative payment method.

In step 1210, the server computer 512 processes the transaction using virtual currency data in the consumer profile. When the virtual currency token identifier is associated with the consumer profile entry, the authorization module 512*b*-2 then proceeds with processing the transaction contained in the transaction payload 404 of the network protocol packet 400.

In some embodiments, processing the transaction using virtual currency data may involve first determining a transaction total retrieved from the transaction payload. For example, the transaction total may be $10 for the purchase of food from merchant M1086. The authorization module 512*b*-2 may evaluate the transaction total for the transaction, and then determine a virtual currency amount associated with the virtual currency token identifier.

The authorization module 512*b*-2 may query the consumer database 526 with the consumer identifier and identify the consumer profile entry associated with the consumer identifier and the virtual currency token identifier. The authorization module 512*b*-2 may then retrieve the virtual currency amount associated with the virtual currency token identifier from the virtual currency data. Continuing the example described above, the authorization module 512*b*-2 may use the consumer identifier C1122 and the virtual currency token identifier VC8111233, to determine the value virtual currency token. In this example, the virtual currency amount associated with the virtual currency token identifier would be determined to be 1000 units of virtual currency.

The authorization module 512*b*-2 may then compare the virtual currency amount associated with the virtual currency token identifier with a converted transaction total to determine if the virtual currency amount is greater than or sufficient to cover the converted transaction total.

In order to calculate the converted transaction total, the authorization module 512*b*-2 may determine a value exchange rate between a unit of the virtual currency and the transaction currency for the transaction and use the value exchange rate to determine the converted transaction total. For example, if the value exchange rate is 100 units of virtual currency are equal to 1 U.S. Dollar, the authorization module 512*b*-2 would determine that a transaction for $10 would require 1000 units of virtual currency. Thus, 1000 units of virtual currency would be the converted transaction total.

The authorization module 512*b*-2 may then compare the virtual currency amount and the converted transaction total to determine whether the virtual currency amount is greater than the converted transaction total. When the virtual currency amount is greater than the converted transaction total, the authorization module 512*b*-2 may authorize the transaction.

A transaction identifier may be generated for the transaction by the authorization module 512*b*-2 and stored in the transaction database 530. For example, using the example from above, transaction identifier T8022 may be generated and stored for the transaction by C1122 with merchant M1086 for 1000 units of virtual currency issued by I0541 and using virtual currency token identifier VC8111233. Additional details associated with the transaction may also be stored, including transaction data/time, the device identifier for the mobile device 502 used by the consumer, and the geographic coordinates (or other location identifier) where the transaction occurred.

In some embodiments, the issuer profile entry in the issuer database 524 may also be updated with transaction data for the transaction. In such embodiments, the virtual currency server computer 512 may also send a notification message to the issuer indicating that virtual currency issued by the issuer was used in the transaction. This may allow the issuer to have knowledge and data on the usage of virtual currency that it purchased for the consumer. This may allow the issuer to better target consumers, incentivize preferred consumer actions, build customer satisfaction and brand loyalty, and further tailor future virtual currency programs, rewards, etc., to the interests of their customers.

Generating and storing the transaction identifier in the transaction database 530, with the associated issuer identifier, consumer identifier, merchant identifier, and virtual currency token identifier provides numerous benefit. This allows the data stored on the issuer database 524, consumer database 526, merchant database 528, and transaction database 530 to be cross-referenced based on any of the above-noted identifiers, as well as others contained in the transaction database 530. A virtual currency issuer may be able to determine the transactions associated with the virtual currency. A merchant may be able to determine the virtual currency issuer for the virtual currency involved in a transaction. Thus, as all parties can identify, monitor and evaluate the other parties in the transaction, transactions using virtual currency are more transparent than in current configurations.

In step 1212, the virtual currency server computer 512 generates a response message indicating authorization of the transaction. Once the authorization module 512b-2 has authorized the transaction, the authorization module 512b-2 may generate a response message indicating the result of the authorization. The response message may include some or all of the data received in the network protocol packet 400, as well as the transaction identifier for the transaction. In some embodiments of the present invention, the response message may be generated in, for example, an internet protocol communications protocol. In other embodiments, the response message may be generated in any other suitable communications protocol.

In step 1214, the virtual currency server computer 512 transmits the response message to the mobile device 502. The authorization module 512b-2 may then send the generated response message to the mobile device 502 via a mobile network 510. In some embodiments, the response message may be sent through a protocol conversion module 522 prior to being sent across the mobile network 510. The response message may indicate that the transaction was authorized or not authorized. The authorization module 512b-2 may also send the response message to the merchant associated with the transaction in order to allow the merchant to finalize the transaction.

In alternative embodiments, the response message may be sent to one or both of the merchant and the mobile device 502 across a communications network, such as the Internet.

4. Settlement of a Transaction Using Virtual Currency

After a transaction has been authorized and completed, the payment processing network 514 may receive a settlement file from a merchant associated with the transaction. The settlement file may include an indicator that the transaction was completed using a consumer account containing virtual currency. The settlement file may further include a transaction identifier identifying the transaction, a consumer identifier, and a merchant identifier. For example, the settlement file may include transaction identifier T8022, a transaction amount of 1000 units of virtual currency, consumer identifier 1122 and merchant identifier M1086.

The settlement module 512b-3 may query a transaction database 530 with the transaction identifier to retrieve a transaction record for the transaction. The transaction record may include a plurality of fields/categories, including "Transaction Identifier", "Transaction Amount", "Transaction Time", "Virtual Currency Token ID", "Issuer Identifier", "Consumer Identifier", "Merchant Identifier", "Location Identifier", "Geo Coordinates", "Device Identifier", and "Acquirer Identifier".

The settlement module 512b-3 may evaluate the transaction record to retrieve the virtual currency token identifier associated with the transaction. The settlement module 512b-3 may further determine a merchant account associated with the merchant identifier by accessing the merchant database 528 and locating a merchant profile entry associated with the merchant identifier. Using the previous example, the settlement module 512b-3 may retrieve merchant data associated with merchant identifier M1086, including merchant account number 6793511222.

The verification module 512b-4 may perform a verification or authentication process, similarly to that described previously, using the data sent as part of the settlement file (e.g., the transaction identifier, merchant identifier, consumer identifier).

The settlement module 512b-3 may then issue a credit to the merchant account for the transaction total. The settlement module 512b-3 may access the merchant database 528 and update an "Account Value" for a merchant account for the merchant associated with the transaction.

The settlement module 512b-3 may also update a consumer account in the consumer profile entry by deducting the converted transaction total from the consumer account. For example, if the transaction amount for transaction T8022 was 1000 units of virtual currency, the settlement module 512b-3 may deduct 1000 units of virtual currency from consumer account number 7462940618, the consumer account associated with the transaction.

The settlement process is easier and more efficient than previous systems associated with virtual currency because the central virtual currency server computer 512 can perform all of the settlement processing without requiring the interaction with multiple merchants, acquirers, issuers, etc. The virtual currency transaction is completed in a single transaction (i.e., a single exchange occurs) and money is not exchanged multiple times through multiple entities.

Furthermore, additional advantages are provided by the centralized virtual currency server computer 512, as it can track and log all transactions that have typically been untraceable by a central provider. For example, money laundering and other such illegal transactions would be much harder than previous systems because the virtual currency and associated transactions are being tracked and traced from the moment the virtual currency is generated through when the virtual currency is used and money is exchanged from the virtual currency provider. Accordingly, multiple advantages are provided by embodiments of the present invention.

III. ADDITIONAL EMBODIMENTS

In additional embodiments of the present invention, the information retrieved from the network header portion 402b of the network protocol packet 400 and stored in the issuer database 524, consumer database 526, merchant database 528, and the transaction database 530, may be used to provide enhanced consumer tracking. For example, a merchant who requested the issuance of virtual currency to the consumer may use the data to track the consumer's use of the virtual currency, including where and when the consumer performed a transaction using the virtual currency.

In some embodiments of the invention, the data in the network protocol packet 400 may provide improved fraud detection. For example, the verification module 512b-4 may analyze the settlement file message and compare the transaction data with data stored in the transaction database 530. In some embodiments, by cross-referencing data stored in the issuer database 524, consumer database 526, merchant database 528, and the transaction database 530, using the merchant identifier, location identifier, and device identifier associated with a consumer identifier, a potentially fraudulent transaction may be detected.

For example, the verification module 512b-4 may determine from the databases 524-530 that the device identifier associated with the mobile device 502 made a first purchase at a merchant in San Francisco, Calif. and a second purchase an hour later at a merchant in New York City. The verification module 512b-4 may use this data to determine that the current transaction is fraudulent or suspect as two transactions using the same device identifier would likely not be conducted at the two different merchants within a short span of time. In another example, a transaction may not be legitimate if the device identifier is not associated with the consumer identifier of record (e.g., the device identifier for the transaction is not found in the entry for the consumer identifier stored in the consumer tables 524).

In another example, verification module 512b-4 may use the device identifier to verify the consumer. The verification module 512b-4 may evaluate a consumer identifier (e.g. janedoe@server.com), and a device identifier (e.g., 415-555-1234) received in the network header portion 518a. The verification module 512b-4 may access the consumer database 526 using the consumer identifier. If the consumer account of the consumer has been compromised and is being used on a different mobile device 502, the profile in the consumer database 526 associated with the consumer identifier ("janedoe@server.com") may not have the device identifier for the mobile device 502 conducting the transaction. This may be an indication that the transaction in the transaction payload 404 is being conducted using consumer account data on a mobile device 502 not associated with the consumer, which may be indicative of potential fraud.

Traditional fraud analyses may be limited to transactions performed using a particular payment device. For example, traditionally an issuing bank may evaluate the transaction history associated with a credit card it issued and may be able to determine indicia of fraud. In embodiments of the present invention, however, because all transactions may be tracked and stored in the databases 524-530 using an issuer identifier assigned to all issuers (e.g., traditional issuers and virtual currency issuers), the payment processing network can evaluate more easily track and cross-reference transactions it processes, regardless of whether it was performed using a standard payment device (e.g., credit card, debit card, stored value card) or with virtual currency.

IV. EXEMPLARY APPARATUSES

Figure 13:
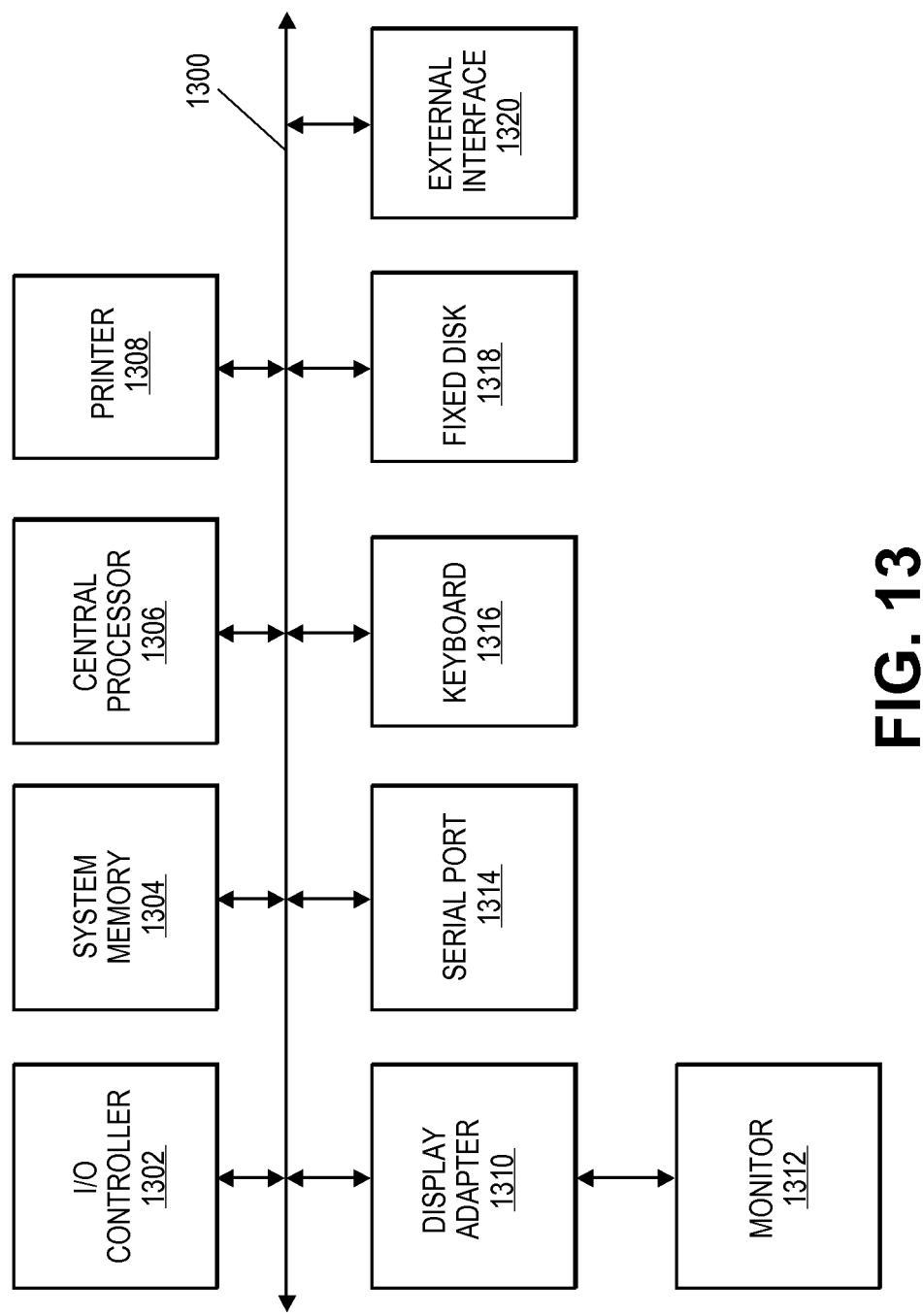
FIG. 13 shows a block diagram of a computer apparatus according to an embodiment of the present invention.

The various participants and elements may operate one or more computer apparatuses (e.g., a server computer) to facilitate the functions described herein. Any of the elements in the figures may use any suitable number of subsystems to facilitate the functions described herein. Examples of such subsystems or components are shown in FIG. 13. The subsystems shown in FIG. 13 are interconnected via a system bus 1300. Additional subsystems such as a printer 1308, keyboard 1316, fixed disk 1318 (or other memory comprising computer readable media), monitor 1312, which is coupled to display adapter 1310, and others are shown. Peripherals and input/output (I/O) devices, which couple to I/O controller 1302, can be connected to the computer system by any number of means known in the art, such as serial port 1314. For example, serial port 1314 or external interface 1320 can be used to connect the computer apparatus to a wide area network such as the Internet, a mouse input device, or a scanner. The interconnection via system bus 1300 allows the central processor 1306 to communicate with each subsystem and to control the execution of instructions from system memory 1304 or the fixed disk 1318, as well as the exchange of information between subsystems. The system memory 1304 and/or the fixed disk 1318 may embody a computer readable medium.

Further, while the present invention has been described using a particular combination of hardware and software in the form of control logic and programming code and instructions, it should be recognized that other combinations of hardware and software are also within the scope of the present invention. The present invention may be implemented only in hardware, or only in software, or using combinations thereof.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited in this patent are hereby incorporated by reference for all purposes.

One or more features from any embodiment may be combined with one or more features of any other embodiment without departing from the scope of the disclosure.

In some embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

All patents, patent applications, publications, and descriptions mentioned above are herein incorporated by reference in their entirety for all purposes. None is admitted to be prior art.

What is claimed is:

1. A method comprising:

receiving, by a server computer, a network protocol packet including a network protocol header and a transaction payload for a transaction conducted using virtual currency, the network protocol header including a network header portion, the network header portion including a transaction type identifier indicating whether the transaction is a financial transaction using virtual currency, an issuer identifier, a virtual currency token identifier, and a consumer identifier, and the transaction payload including an authorization request message;

determining that the transaction type identifier in the network protocol header indicates the network protocol packet is associated with the financial transaction using virtual currency;

parsing, by the server computer, the issuer identifier, the consumer identifier, and the virtual currency token identifier from the network header portion;

determining, by the server computer, a consumer profile using the consumer identifier;

prior to processing the authorization request message in the transaction payload of the network protocol packet, verifying, by the server computer, that the issuer identifier and the virtual currency token identifier parsed from the network header portion are associated with the consumer profile determined by the consumer identifier parsed from the network header portion;

subsequent to verifying that the issuer identifier and the virtual currency token identifier are associated with the consumer profile, processing, by the server computer, the transaction using virtual currency data in the consumer profile and the authorization request message in the transaction payload of the network protocol packet;

generating, by the server computer, a response message indicating authorization of the transaction;

transmitting, by the server computer, the response message to a communication device;

wherein the network protocol packet is received from a location proxy that is in communication with a location terminal and a point-of-sale (POS) terminal; and wherein the location proxy generates the network header portion of the network protocol packet by combining header fields received from both the location terminal and the POS terminal.

2. A method comprising:

receiving, by a server computer, a network protocol packet including a network protocol header and a transaction payload for a transaction conducted using virtual currency, the network protocol header including a network header portion, the network header portion including a transaction type identifier indicating whether the transaction is a financial transaction using virtual currency, an issuer identifier, a virtual currency token identifier, and a consumer identifier, and the transaction payload including an authorization request message;

determining that the transaction type identifier in the network protocol header indicates the network protocol packet is associated with the financial transaction using virtual currency;

parsing, by the server computer, the issuer identifier, the consumer identifier, and the virtual currency token identifier from the network header portion;

determining, by the server computer, a consumer profile using the consumer identifier;

prior to processing the authorization request message in the transaction payload of the network protocol packet, verifying, by the server computer, that the issuer identifier and the virtual currency token identifier parsed from the network header portion are associated with the consumer profile determined by the consumer identifier parsed from the network header portion;

subsequent to verifying that the issuer identifier and the virtual currency token identifier are associated with the consumer profile, processing, by the server computer, the transaction using virtual currency data in the consumer profile and the authorization request message in the transaction payload of the network protocol packet;

generating, by the server computer, a response message indicating authorization of the transaction;

transmitting, by the server computer, the response message to a communication device;

wherein the network protocol packet is received from a location proxy that is in communication with a location terminal and a point-of-sale (POS) terminal;

wherein the network header portion further includes a device identifier identifying the communication device; and wherein the device identifier is provided to the location proxy by both the location terminal and the POS terminal.

* * * * *